United States Patent [19]
Minor

[11] Patent Number: 6,013,194
[45] Date of Patent: *Jan. 11, 2000

[54] AZEOTROPE(LIKE) COMPOSITIONS INCLUDING A HEXAFLUOROPROPANE AND BUTANE

[75] Inventor: Barbara Haviland Minor, Elkton, Md.

[73] Assignee: E.I. duPont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/847,981

[22] Filed: Apr. 21, 1997

Related U.S. Application Data

[60] Division of application No. 08/362,309, Dec. 22, 1994, Pat. No. 5,645,754, which is a continuation-in-part of application No. 08/187,934, Jan. 27, 1994, abandoned, which is a continuation-in-part of application No. 08/141,184, Oct. 26, 1993, abandoned, which is a continuation-in-part of application No. 08/025,017, Mar. 2, 1993, abandoned.

[51] Int. Cl.[7] .............. C09K 5/04; C11D 7/30; C08J 9/14
[52] U.S. Cl. .............. 252/67; 510/177; 510/408; 134/12; 134/38; 134/40; 134/42; 62/114; 264/DIG. 5; 521/98; 521/131
[58] Field of Search .............. 252/67; 510/177, 510/408; 134/12, 38, 40, 42; 62/114, 324.1; 521/98, 131; 264/DIG. 5, 53

[56] References Cited

U.S. PATENT DOCUMENTS

| | | | |
|---|---|---|---|
| 3,881,949 | 5/1975 | Brock | 134/31 |
| 3,922,228 | 11/1975 | Hutchinson | 252/67 |
| 4,541,943 | 9/1985 | Powell | 252/67 |
| 4,559,154 | 12/1985 | Powell | 252/67 |
| 4,783,276 | 11/1988 | Bohnenn | 252/67 |
| 5,084,190 | 1/1992 | Fernandez | 252/8 |
| 5,096,933 | 3/1992 | Volkert | 521/131 |
| 5,182,040 | 1/1993 | Bartlett et al. | 252/67 |
| 5,187,206 | 2/1993 | Volkert et al. | 521/129 |
| 5,188,748 | 2/1993 | Arnaud et al. | 252/67 |
| 5,205,956 | 4/1993 | Volkert et al. | 252/350 |
| 5,221,492 | 6/1993 | Bartlett | 252/67 |
| 5,221,992 | 6/1993 | Barlett | 252/67 |
| 5,254,309 | 10/1993 | Felix et al. | 422/34 |
| 5,278,196 | 1/1994 | Robin et al. | 521/98 |
| 5,290,823 | 3/1994 | Volkert | 521/131 |
| 5,300,534 | 4/1994 | Volkert et al. | 521/98 |
| 5,393,524 | 2/1995 | Quay | 424/9 |
| 5,409,688 | 4/1995 | Quay | 424/9 |
| 5,441,659 | 8/1995 | Minor | 252/67 |
| 5,458,798 | 10/1995 | Lunger et al. | 252/67 |
| 5,558,854 | 9/1996 | Quay | 424/9.52 |

FOREIGN PATENT DOCUMENTS

| | | |
|---|---|---|
| 2009169 | 8/1990 | Canada . |
| 2272086 | 11/1990 | Japan . |
| 5202220 | 8/1993 | Japan . |
| 5230265 | 9/1993 | Japan . |
| 5279659 | 10/1993 | Japan . |
| WO 92/00345 | 1/1992 | WIPO . |
| WO 93/09200 | 5/1993 | WIPO . |
| 5279659 | 10/1993 | WIPO . |
| WO 96/36689 | 11/1996 | WIPO . |

OTHER PUBLICATIONS

Concise Science Dictionary, paperback ed., Oxford University Press, p. 385, 1984, Month not known.

*Primary Examiner*—Douglas J. McGinty

[57] ABSTRACT

Compositions disclosed include hexafluoropropane and a hydrocarbon having from 1 to 5 carbon atoms or dimethyl ether. These compositions are useful as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

20 Claims, 19 Drawing Sheets

6,013,194

AZEOTROPE(LIKE) COMPOSITIONS INCLUDING A HEXAFLUOROPROPANE AND BUTANE

CROSS-REFERENCE TO RELATED APPLICATION

This is a division of application Ser. No. 08/362,309, filed on Dec. 22, 1994, now U.S. Pat. No. 5,645,754, which is a continuation-in-part of Ser. No. 08/187,934, filed Jan. 27, 1994, now abandoned, which is a continuation-in-part of Ser. No. 08/141,184, filed Oct. 26, 1993, abandoned, which is a continuation-in-part of Ser. No. 08/025,017, filed Mar. 2, 1993 abandoned.

FIELD OF THE INVENTION

This invention relates to refrigerant compositions that include a hydrofluorocarbon as a component. These compositions are useful as refrigerants, cleaning agents, expansion agents for polyolefins and polyarethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable to use as a refrigerant a single fluorinated hydrocarbon or an azeotropic or azeotrope-like composition that includes one or more fluorinated hydrocarbons.

Fluorinated hydrocarbons may also be used as cleaning agents or solvents to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon are also useful as blowing agents in the manufacture of closed-cell polyurethane, phenolic and thermoplastic foams, as propellants in aerosols, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to the discovery of compositions of hexafluoropropane and a hydrocarbon having from 1 to 5 carbon atoms or dimethyl ether. Examples of hydrocarbons having from 1 to 5 carbon atoms include butane, cyclopropane, isobutane, propane. Examples of the inventive compositions include compositions of 1,1,2,2,3,3-hexafluoropropane (HFC-236ca) and butane, cyclopropane, isobutane or propane; 1,1,1,2,2,3-hexafluoropropane (HFC-236cb) and butane, cyclopropane, dimethyl ether (DME), isobutane or propane; 1,1,2,3,3,3-hexafluoropropane (HFC-236ea) and butane, cyclopropane, DME, isobutane or propane; and 1,1,1,3,3,3-hexafluoropropane (HFC-236fa) and DME, butane, cyclopropane, isobutane or propane. These compositions are also useful as clean ng agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents. Further, the invention relates to the discovery of binary azeotropic or azeotrope-like compositions comprising effective amounts of 1,1,2,2,3,3-hexafluoropropane and butane, cyclopropane, isobutane or propane; 1,1,1,2,2,3-hexafluoropropane and butane, cyclopropane, DME, isobutane or propane; 1,1,2,3,3,3-hexafluoropropane and butane, cyclopropane, DME, isobutane or propane; and 1,1,1,3,3,3-hexafluoropropane and DME, butane, cyclopropane, isobutane or propane to form an azeotropic or azeotrope-like composition.

DETAILED DESCRIPTION

Figure 1:
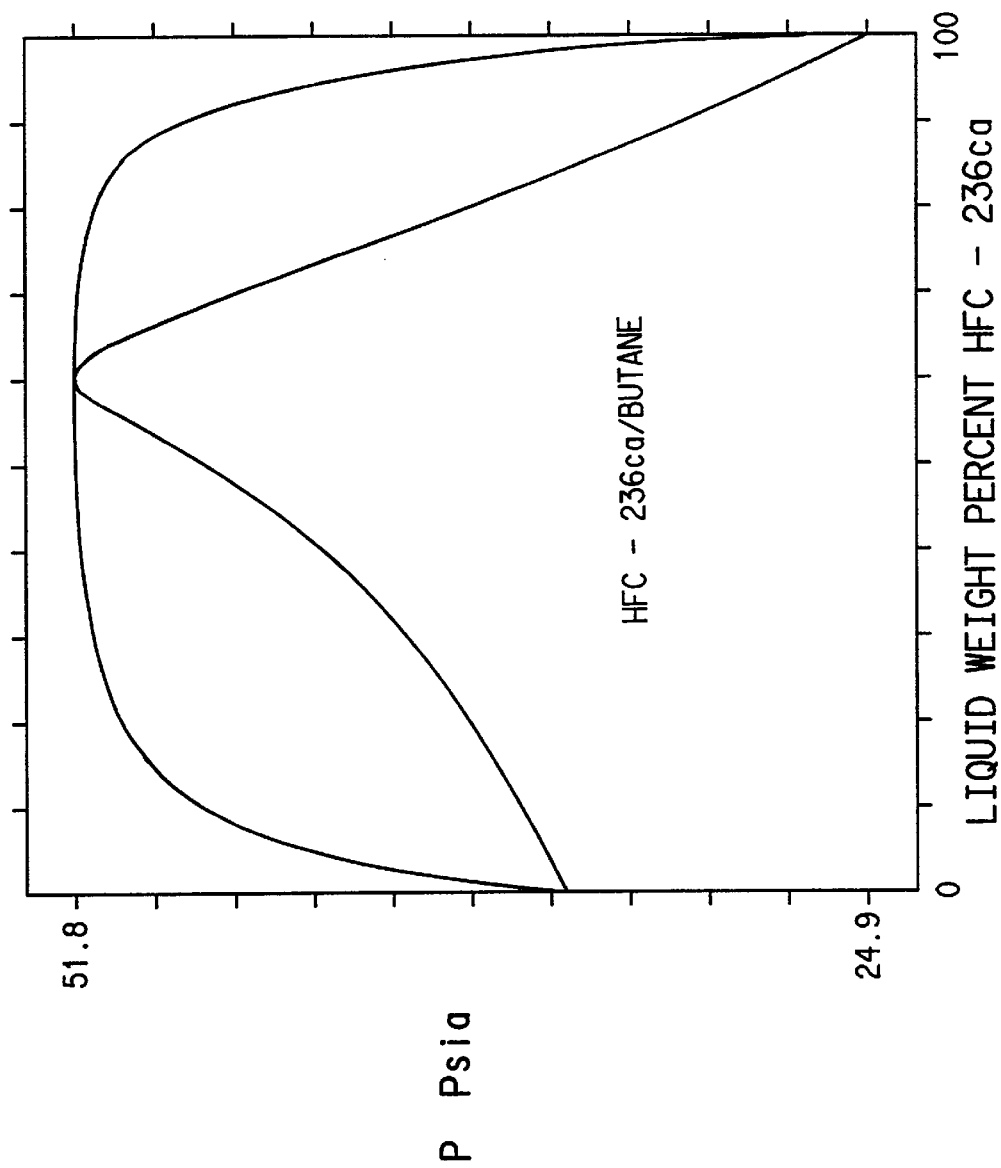
FIG. 1 is a graph of the vapor pressure of liquid mixtures of HFC-236ca and butane at 25° C.
Figure 2:
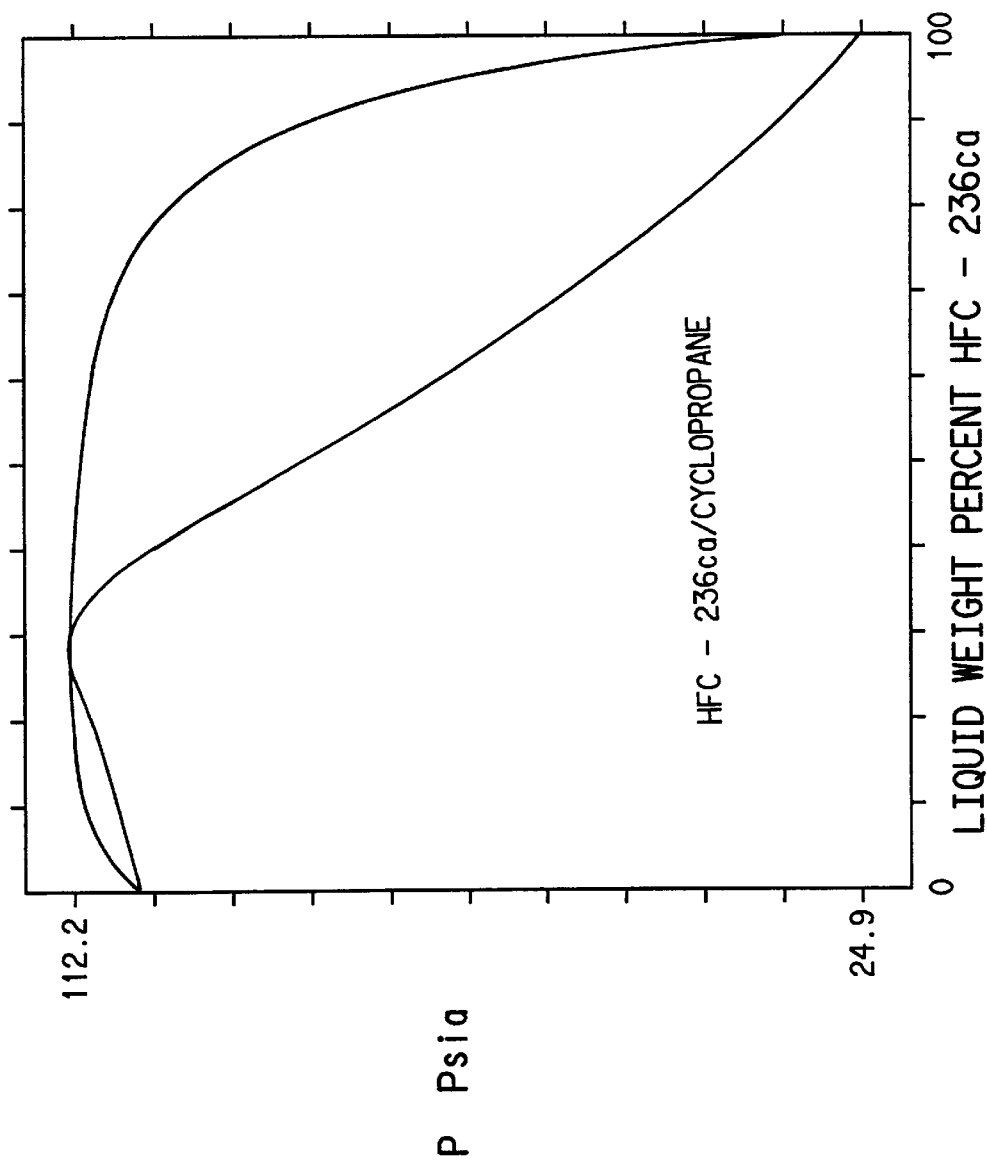
FIG. 2 is a graph of the vapor pressure of liquid mixtures of HFC-236ca and cyclopropane at 25° C.
Figure 3:
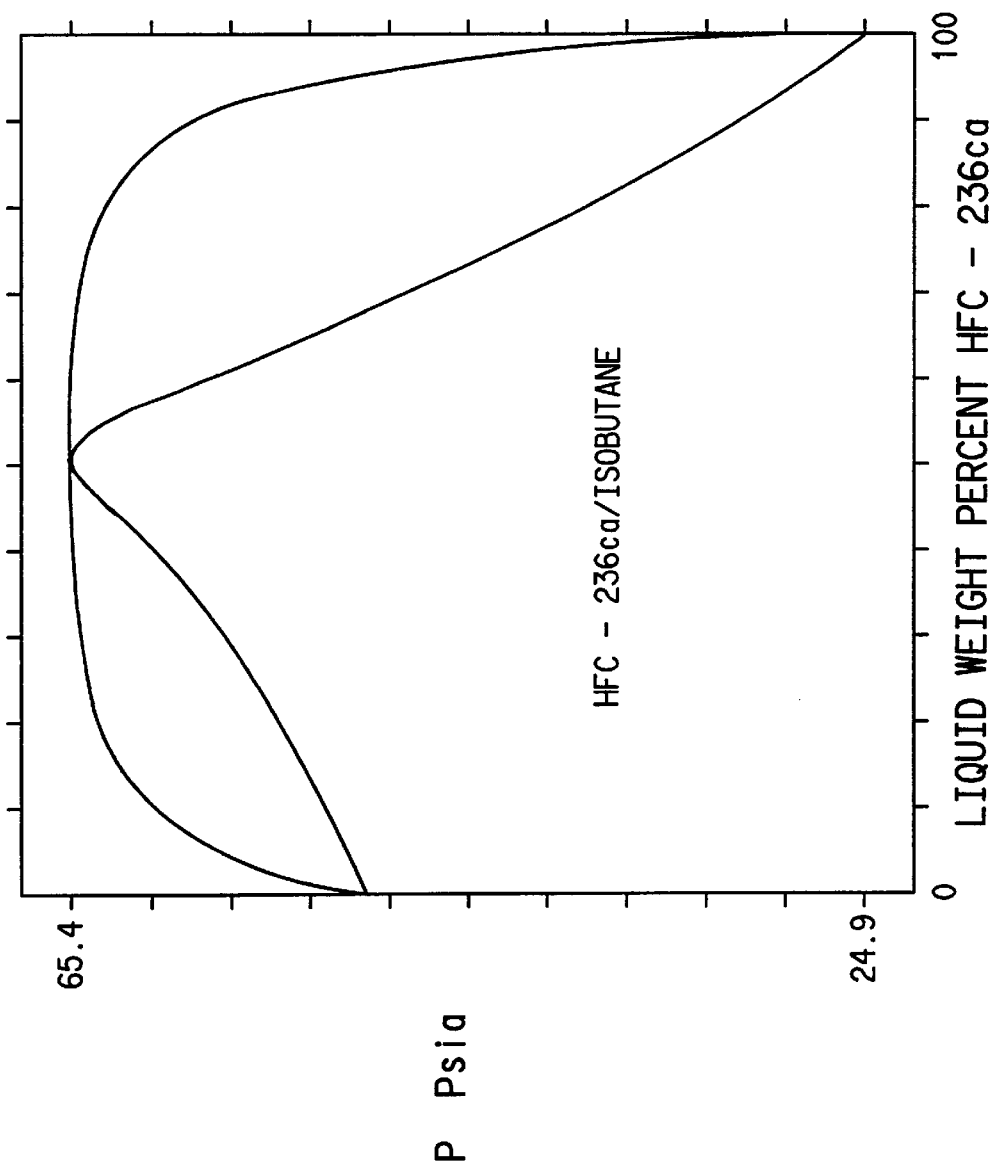
FIG. 3 is a graph of the vapor pressure of liquid mixtures of HFC-236ca and isobutane at 25° C.
Figure 4:
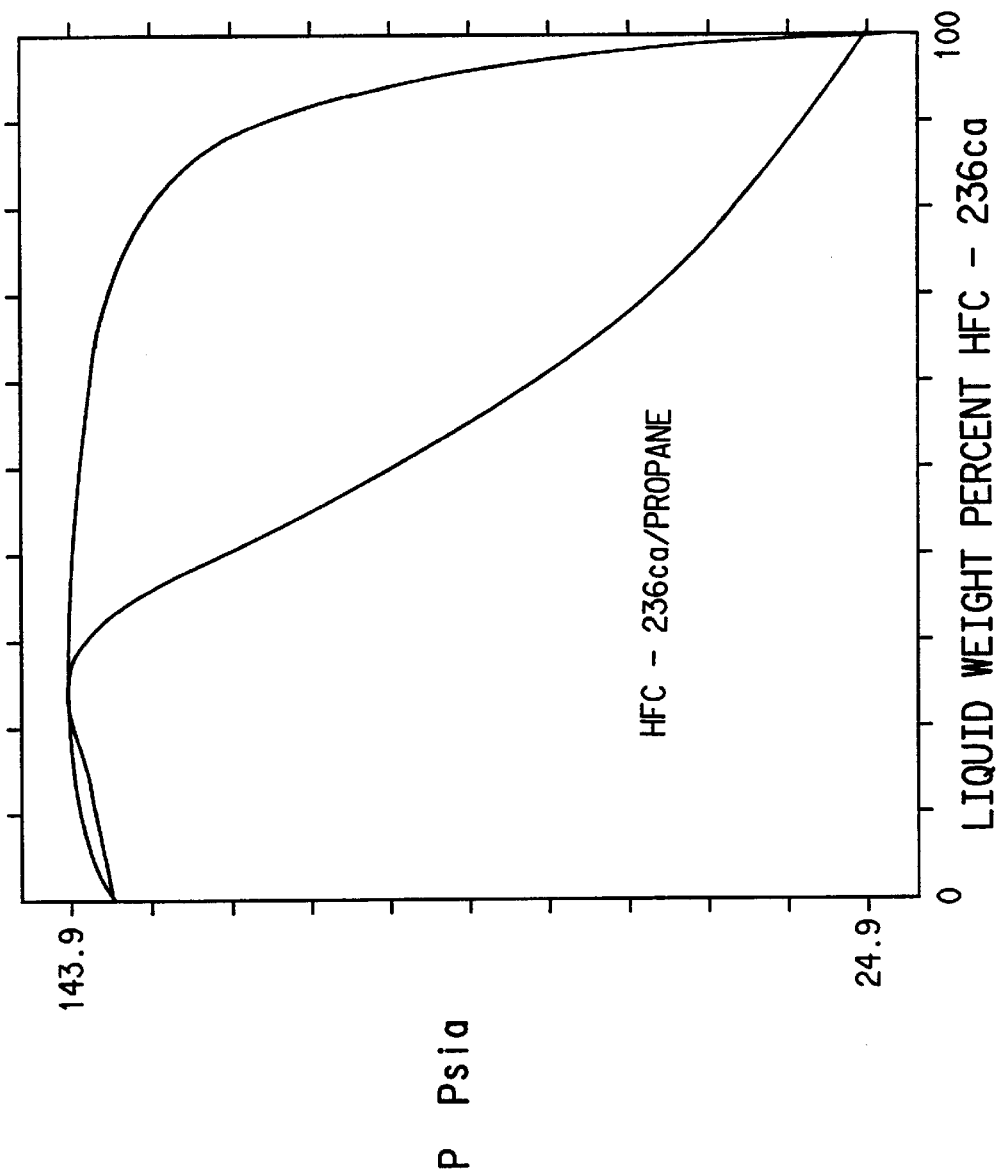
FIG. 4 is a graph of the vapor pressure of liquid mixtures of HFC-236ca and propane at 25° C.
Figure 5:
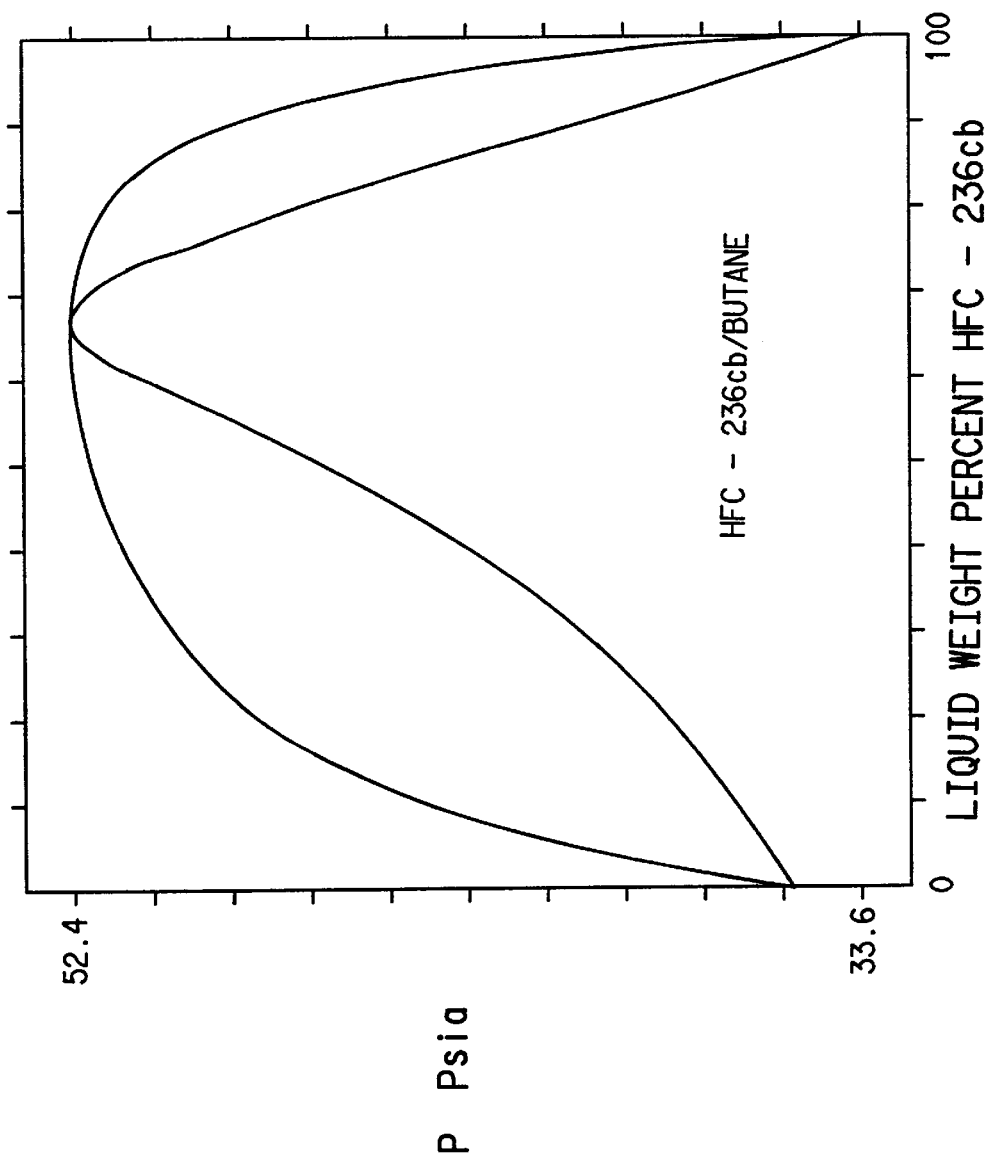
FIG. 5 is a graph of the vapor pressure of liquid mixtures of HFC-236cb and butane at 25° C.
Figure 6:
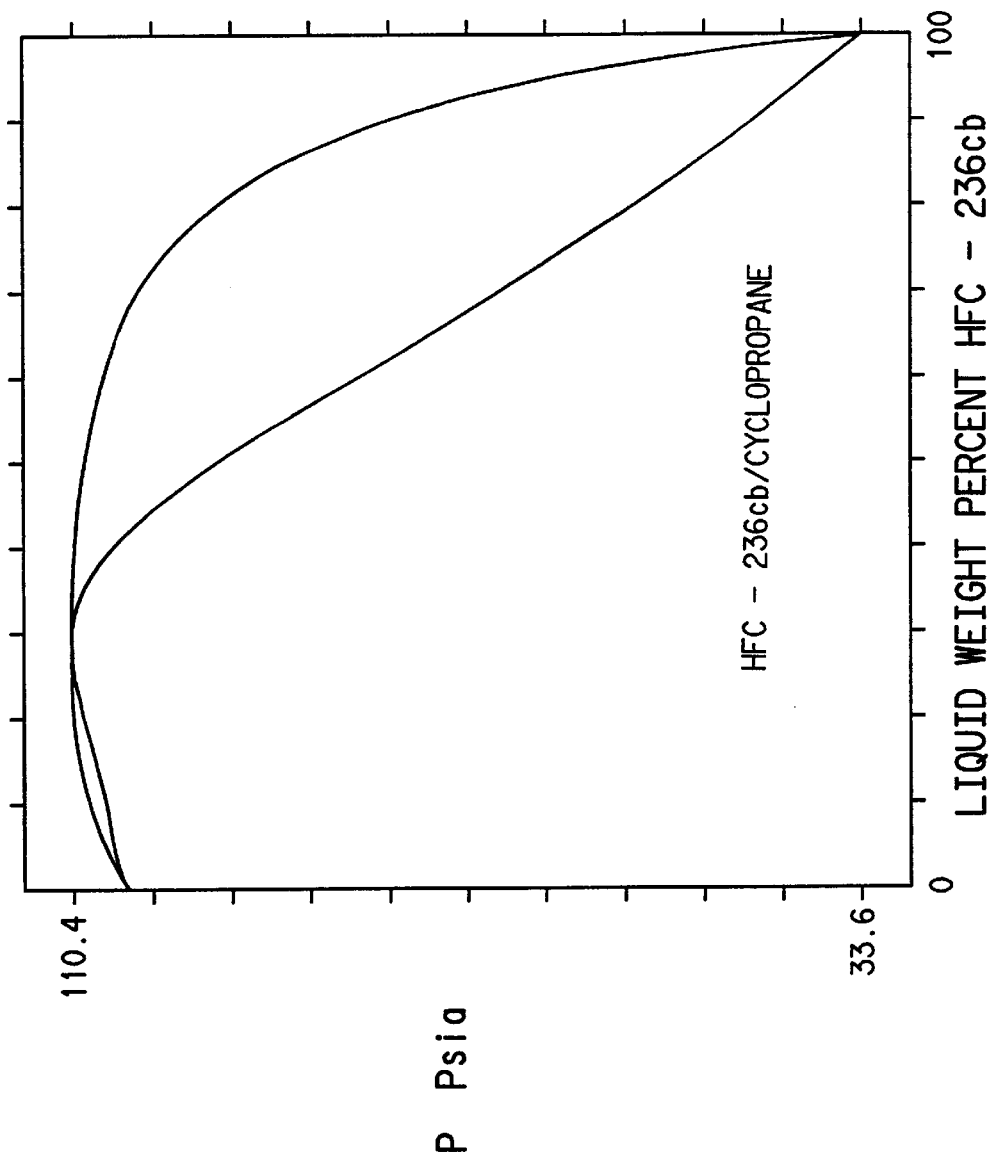
FIG. 6 is a graph of the vapor pressure of liquid mixtures of HFC-236cb and cyclopropane at 25° C.
Figure 7:
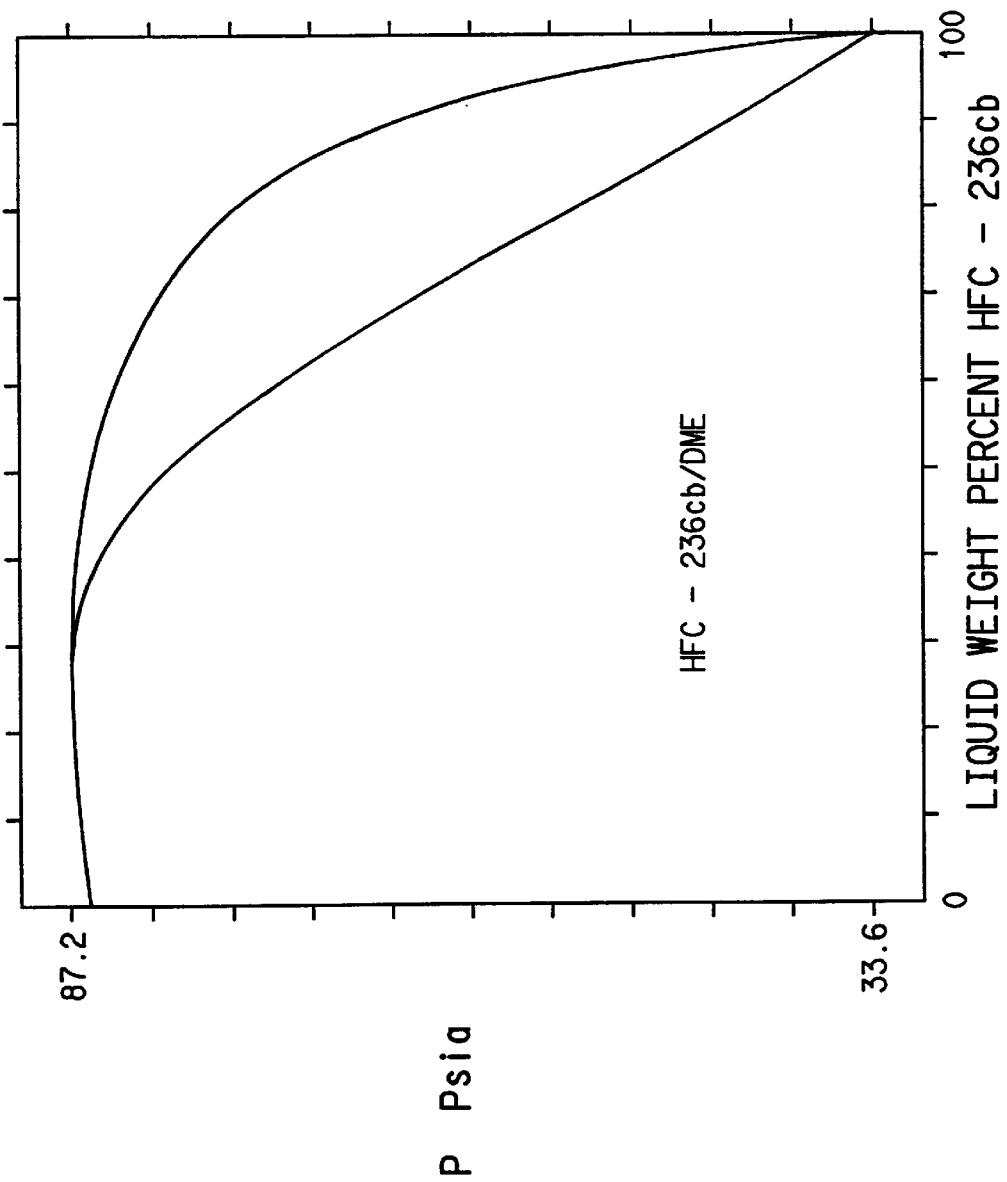
FIG. 7 is a graph of the vapor pressure of liquid mixtures of HFC-236cb and DME at 25° C.
Figure 8:
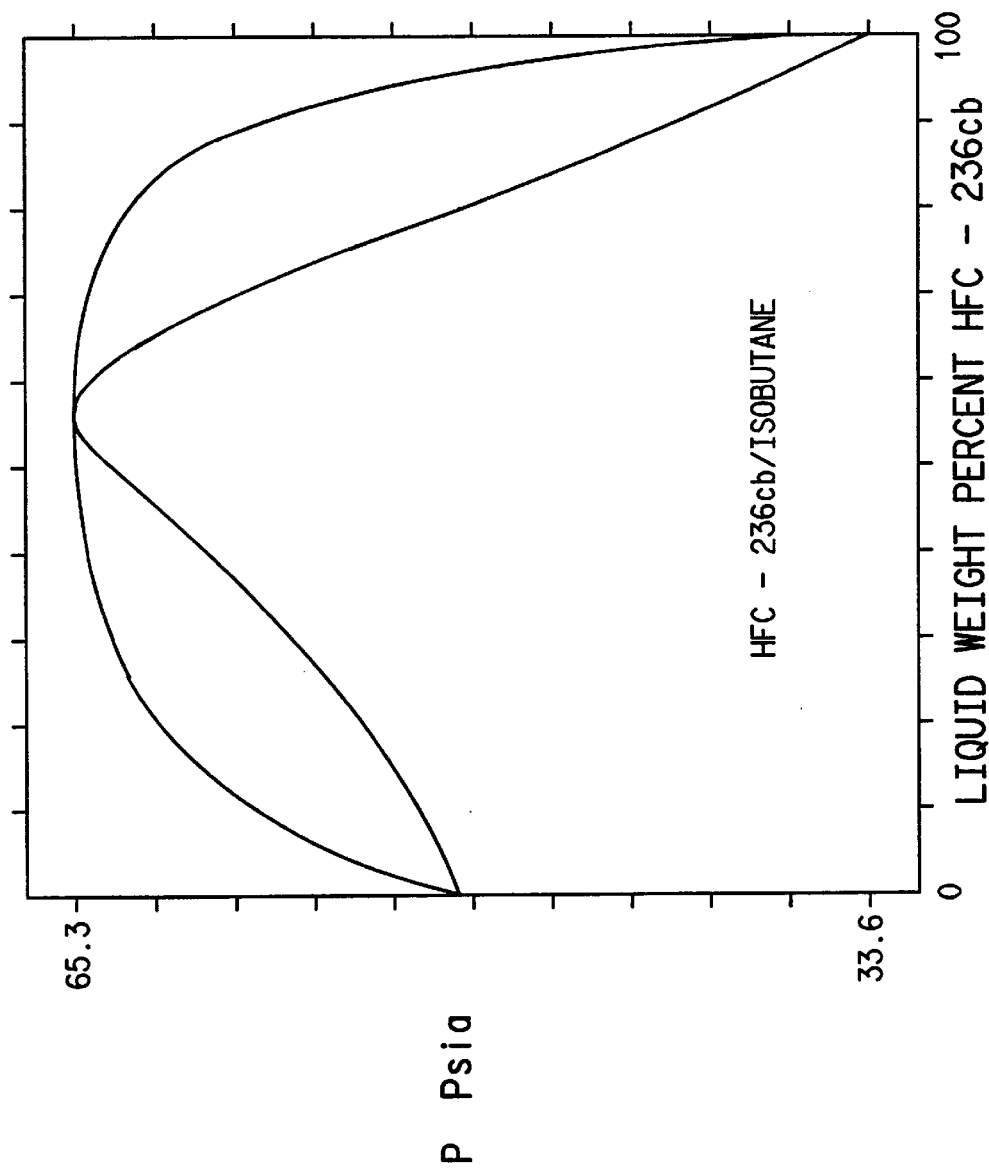
FIG. 8 is a graph of the vapor pressure of liquid mixtures of HFC-236cb and isobutane at 25° C.
Figure 9:
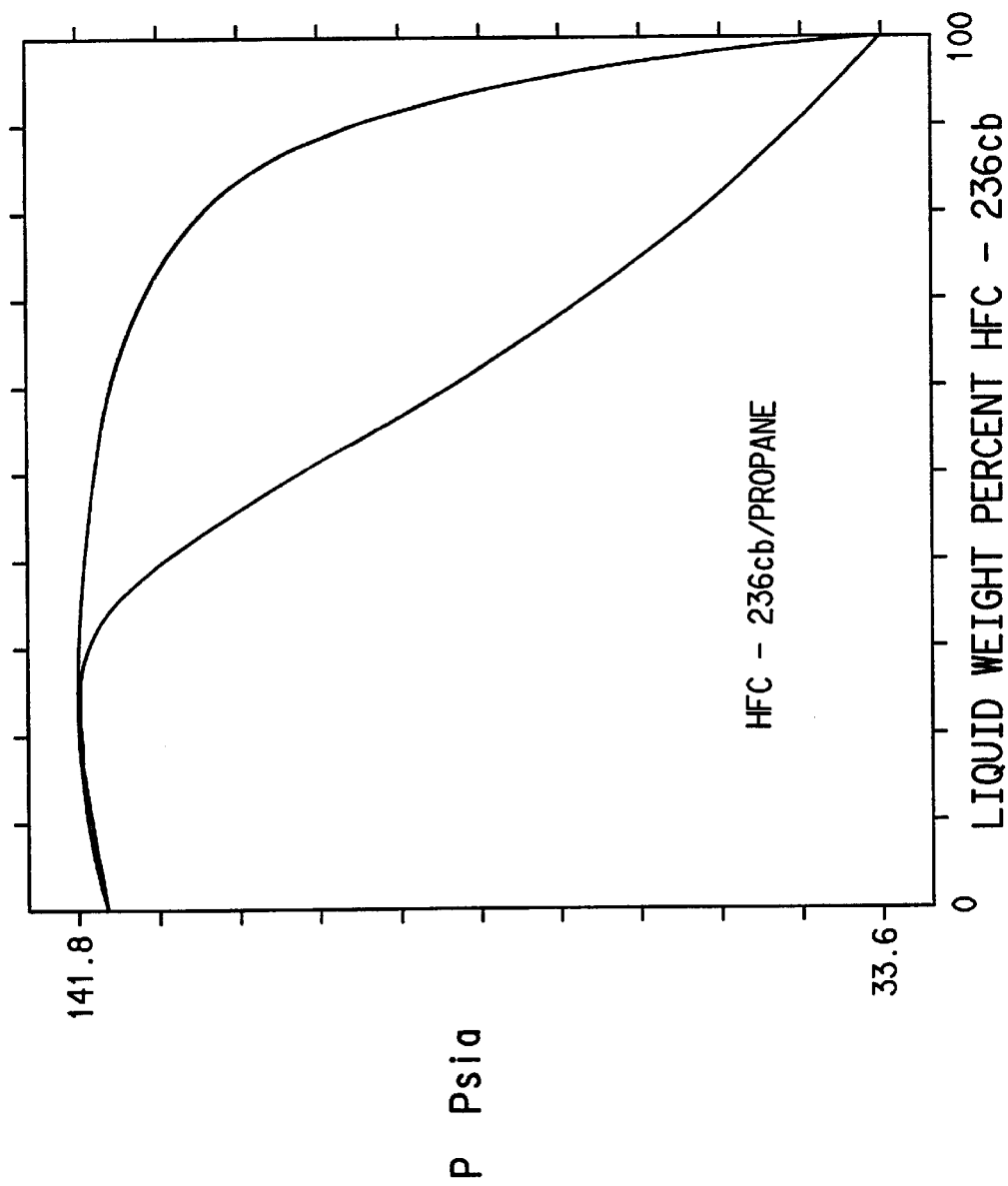
FIG. 9 is a graph of the vapor pressure of liquid mixtures of HFC-236cb and propane at 25° C.
Figure 10:
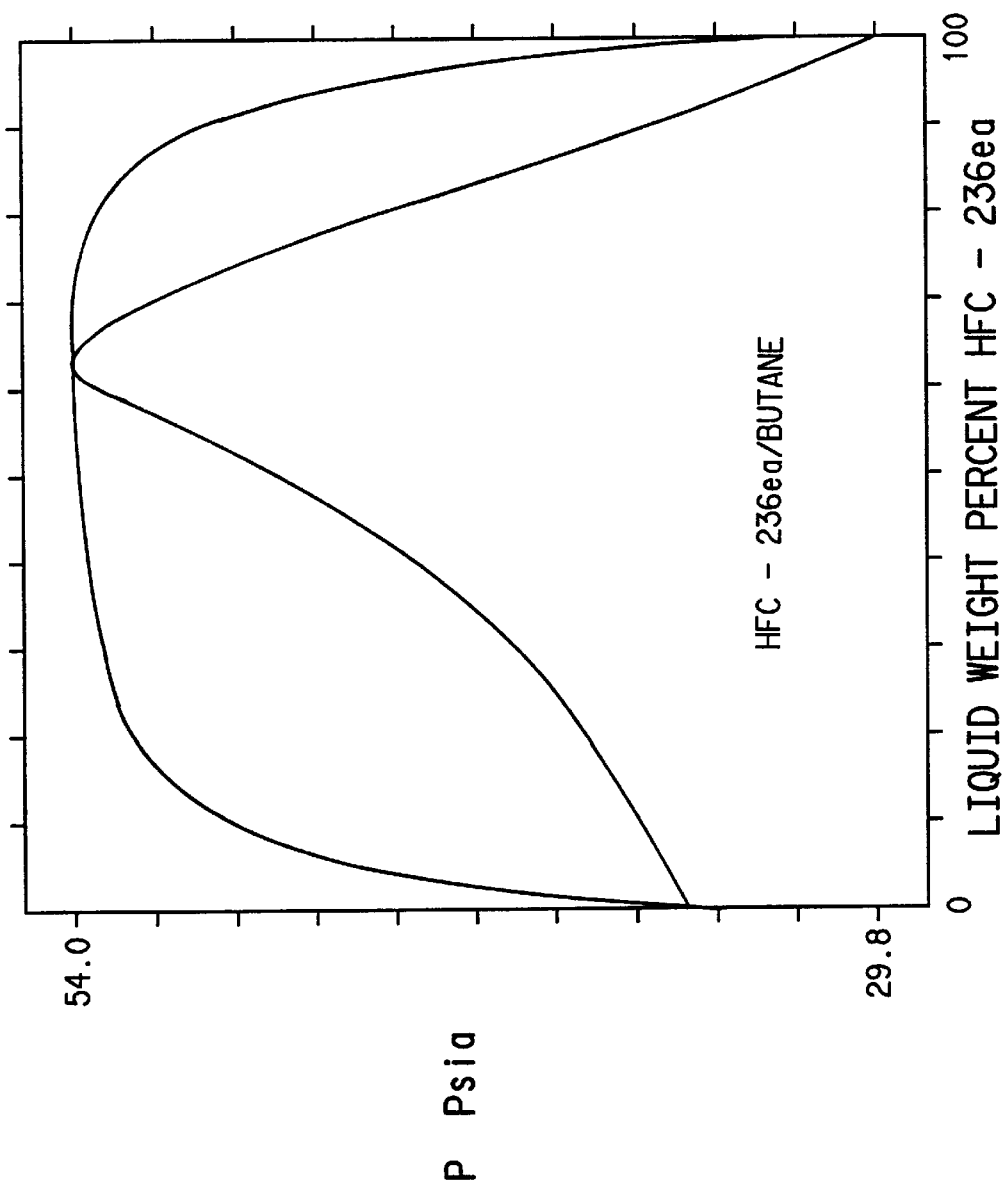
FIG. 10 is a graph of the vapor pressure of liquid mixtures of HFC-236ea and butane at 25° C.
Figure 11:
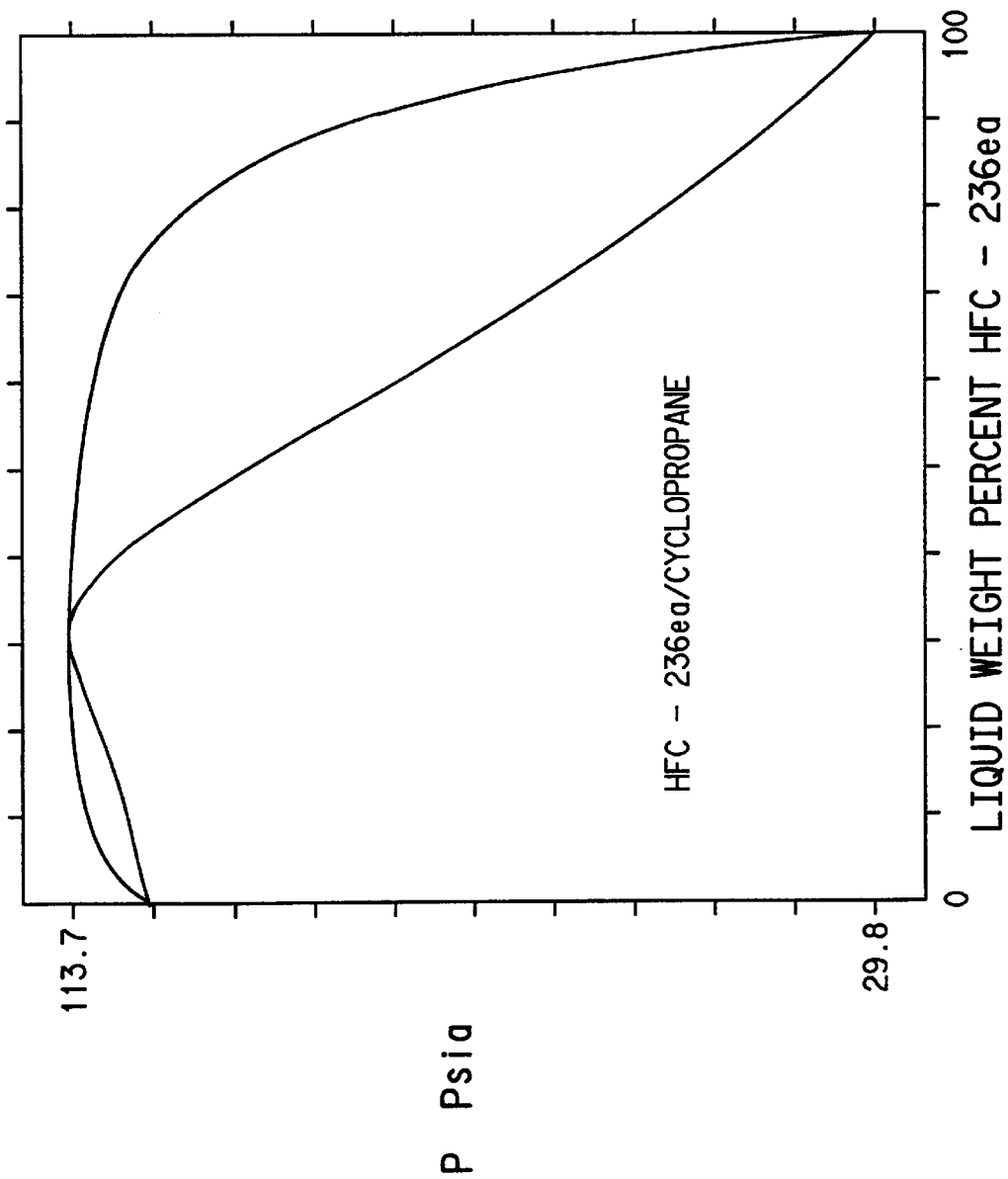
FIG. 11 is a graph of the vapor pressure of liquid mixtures of HFC-236ea and cyclopropane at 25° C.

The present invention relates to compositions of hexafluoropropane and a hydrocarbon having from 1 to 5 carbon atoms or DME. Examples of hydrocarbons having from 1 to 5 carbon atoms include butane, cyclopropane, isobutane, propane, cyclopentane, isopentane and n-pentane. Examples of the inventive compositions include compositions of 1,1,2,2,3,3-hexafluoropropane and butane, cyclopropane, isobutane or propane; 1,1,1,2,2,3-hexafluoropropane and butane, cyclopropane, DME, isobutane or propane; 1,1,2,3,3,3-hexafluoropropane and butane, cyclopropane, DME, isobutane or propane; and 1,1,1,3,3,3-hexafluoropropane and DME, butane, cyclopropane, isobutane or propane.

The present invention also relates to the discovery of azeotropic or azeotrope-like compositions of effective amounts of compositions of hexafluoropropane and butane, cyclopropane, isobutane, propane or DME, including compositions of 1,1,2,2,3,3-hexafluoropropane and butane, cyclopropane, isobutane or propane; 1,1,1,2,2,3-hexafluoropropane and butane, cyclopropane, DME, isobutane or propane; 1,1,2,3,3,3-hexafluoropropane and butane, cyclopropane, DME, isobutane or propane; and 1,1,1,3,3,3-hexafluoropropane and DME, butane, cyclopropane, isobutane or propane to form an azeotropic or azeotrope-like composition. 1–99 wt. % of each of the components of the compositions can be used as refrigerants. Further, the present invention also relates to the discovery of azeotropic or azeotrope-like compositions of effective amounts of each of the above mixtures to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art If an azeotrope is present, there is no difference in vapor pressure between the original composition and the composition remaining after 50 weight percent of the original composition has been removed.

Therefore, included in this invention are compositions of effective amounts of 1,1,2,2,3,3-hexafluoropropane and butane, cyclopropane, isobutane or propane; 1,1,1,2,2,3-hexafluoropropane and butane, cyclopropane, DME, isobutane or propane; 1,1,2,3,3,3-hexafluoropropane and butane, DME, cyclopropane, isobutane or propane; and 1,1,1,3,3,3-hexafluoropropane and DME, butane, cyclopropane, isobutane or propane such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope that, for a maximum boiling azeotrope, have boiling points at a particular pressure higher than the pure components of the composition at that pressure and have vapor pressures lower at a particular temperature than the pure components of the composition at that temperature, and that, for a minimum boiling azeotrope, have boiling points at a particular pressure lower than the pure components of the composition at that pressure and have vapor pressures higher at a particular temperature than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that are substantially constant boiling. In those cases where the range of compositions that have maximum or minimum boiling temperatures at a particular pressure, or maximum or minimum vapor pressures at a particular temperature, are broader than the range of compositions that are substantially constant boiling according to the change in vapor pressure of the composition when 50 weight percent is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at 25° C.

| COMPONENTS | PSIA | KPA |
|---|---|---|
| HFC-236ca | 24.9 | 172 |
| HFC-236cb | 33.6 | 232 |
| HFC-236ea | 29.8 | 205 |
| HFC-236fa | 39.4 | 272 |
| butane | 35.2 | 243 |
| cyclopropane | 105.0 | 724 |
| isobutane | 50.5 | 348 |
| propane | 137.8 | 950 |
| DME | 85.7 | 591 |

Substantially constant boiling, azeotropic or azeotrope-like compositions of this invention comprise the following (all compositions are measured at 25° C.):

| COMPONENTS | WEIGHT RANGES (wt. %/wt/%) | PREFERRED (wt. %/wt. %) |
|---|---|---|
| HFC-236ca/butane | 37–81/19–63 | 50–81/19–50 |
| HFC-236ca/cyclopropane | 1–67/33–99 | 20–67/33–80 |
| HFC-236ca/isobutane | 28–76/24–72 | 30–76/24–70 |
| HFC-236ca/propane | 1–67/33–99 | 20–67/33–80 |
| HFC-236cb/butane | 41–87/13–59 | 50–87/13–50 |
| HFC-236cb/cyclopropane | 1–67/33–99 | 20–67/33–80 |
| HFC-236cb/DME | 1–72/28–99 | 40–72/28–60 |
| HFC-236cb/isobutane | 28–80/20–72 | 40–80/20–60 |
| HFC-236cb/propane | 1–66/34–99 | 10–66/34–90 |
| HFC-236ea/butane | 39–83/17–6 1 | 50–83/17–50 |
| HFC-236ea/cyclopropane | 1–68/32–99 | 20–68/32–80 |
| HFC-236ea/DME | 83–99.3/0.7–17 | 83–99.3/0.7–17 |
| HFC-236ea/isobutane | 31–78/22–69 | 40–78/22–60 |
| HFC-236ea/propane | 1–67/33–99 | 10–67/33–90 |
| HFC-236fa/butane | 50–90/10–50 | 50–90/10–50 |
| HFC-236fa/cyclopropane | 1–70/30–99 | 10–70/30–90 |
| HFC-236fa/isobutane | 33–84/16–67 | 33–84/16–67 |
| HFC-236fa/propane | 1–66/34–99 | 1–66/34–99 |
| HFC-236fa/DME | 75–99/1–25 | 75–99/1–25 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention

EXAMPLE 1

Phase Study

A phase study shows the following compositions are azeotropic. The temperature is 25° C.

| | | Vapor Press. | |
|---|---|---|---|
| Composition | Weight Percents | psia | kPa |
| HFC-236ca/butane | 60.3/39.7 | 51.8 | 357 |
| HFC-236ca/cyclopropane | 28.7/71.3 | 112.2 | 774 |
| HFC-236ca/isobutane | 50.7/49.3 | 65.4 | 451 |
| HFC-236ca/propane | 24.8/75.2 | 143.9 | 992 |

-continued

| Composition | Weight Percents | Vapor Press. psia | Vapor Press. kPa |
|---|---|---|---|
| HFC-236cb/butane | 67.1/32.9 | 52.4 | 361 |
| HFC-236cb/cyclopropane | 29.0/71.0 | 110.4 | 761 |
| HFC-236cb/DME | 24.5/75.5 | 87.2 | 601 |
| HFC-236cb/isobutane | 56.2/43.8 | 65.3 | 450 |
| HFC-236cb/propane | 23.6/76.4 | 141.8 | 978 |
| HFC-236ea/butane | 63.3/36.7 | 54.0 | 372 |
| HFC-236ea/cyclopropane | 30.9/69.1 | 113.7 | 784 |
| HFC-236ea/DME | 99.3/0.7 | 29.8 | 205 |
| HFC-236ea/isobutane | 53.6/46.4 | 68.0 | 469 |
| HFC-236ea/propane | 27.5/72.5 | 145.8 | 1005 |
| HFC-236fa/butane | 74.4/25.6 | 57.9 | 399 |
| HFC-236fa/cyclopropane | 22.4/77.6 | 106.8 | 736 |
| HFC-236fa/isobutane | 63.6/36.4 | 67.8 | 467 |
| HFC-236fa/propane | 7.1/92.9 | 138.0 | 951 |
| HFC-236fa/DME | 98.4/1.6 | 39.3 | 271 |

EXAMPLE 2

Impact of Vapor Leakage on Vapor Pressure at 25° C.

A vessel is charged with an initial liquid composition at 25° C. The liquid, and the vapor above the liquid, are allowed to come to equilibrium, and the vapor pressure In the vessel is measured. Vapor is allowed to leak from the vessel, while the temperature is held constant at 25° C., until 50 weight percent of the initial charge is removed, at which time the vapor pressure of the composition remaining in the vessel is measured. The results are summarized below.

| Refrigerant Composition | 0 wt % evaporated psia | 0 wt % evaporated kPa | 50 wt % evaporated psia | 50 wt % evaporated kPa | 0% change in vapor pressure |
|---|---|---|---|---|---|
| HFC-236ca/butane | | | | | |
| 60.3/39.7 | 51.8 | 357 | 51.8 | 357 | 0.0 |
| 80/20 | 51.1 | 352 | 47.4 | 327 | 7.2 |
| 82/18 | 50.8 | 350 | 45.1 | 311 | 11.2 |
| 81/19 | 51.0 | 352 | 46.3 | 319 | 9.2 |
| 40/60 | 51.6 | 356 | 49.3 | 340 | 4.5 |
| 35/65 | 51.4 | 354 | 43.2 | 298 | 16.0 |
| 38/62 | 51.5 | 355 | 47.7 | 329 | 7.4 |
| 37/63 | 51.5 | 355 | 46.5 | 321 | 9.7 |
| HFC-236ca/cyclopropane | | | | | |
| 28.7/71.3 | 112.2 | 774 | 112.2 | 774 | 0.0 |
| 15/85 | 111.6 | 769 | 109.8 | 757 | 1.6 |
| 1/99 | 106.2 | 732 | 105.1 | 725 | 1.0 |
| 50/50 | 111.4 | 768 | 109.7 | 756 | 1.5 |
| 70/30 | 107.4 | 741 | 92.8 | 640 | 13.6 |
| 65/35 | 109.1 | 752 | 100.2 | 691 | 8.2 |
| 67/33 | 108.5 | 748 | 97.6 | 673 | 10.0 |
| HFC-236ca/isobutane | | | | | |
| 50.7/49.3 | 65.4 | 451 | 65.4 | 451 | 0.0 |
| 70/30 | 65.0 | 448 | 63.2 | 436 | 2.8 |
| 80/20 | 63.8 | 440 | 52.2 | 360 | 18.2 |
| 75/25 | 64.6 | 445 | 60.1 | 414 | 7.0 |
| 77/23 | 64.3 | 443 | 57.7 | 398 | 10.3 |
| 76/24 | 64.5 | 445 | 59.0 | 407 | 8.5 |
| 30/70 | 65.0 | 448 | 60.6 | 418 | 6.8 |
| 27/73 | 64.8 | 447 | 57.3 | 395 | 11.6 |
| 28/72 | 64.9 | 447 | 58.5 | 403 | 9.9 |
| HFC-236ca/propane | | | | | |
| 24.8/75.2 | 143.9 | 992 | 143.9 | 992 | 0.0 |
| 10/90 | 142.6 | 983 | 140.9 | 971 | 1.2 |
| 1/99 | 138.6 | 956 | 138.0 | 951 | 0.4 |
| 50/50 | 142.5 | 983 | 140.3 | 967 | 1.5 |
| 60/40 | 141.2 | 974 | 135.2 | 932 | 4.2 |
| 65/35 | 140.1 | 966 | 129.9 | 896 | 7.3 |
| 68/32 | 139.3 | 960 | 125.0 | 862 | 10.3 |
| 67/33 | 139.6 | 963 | 126.8 | 874 | 9.2 |
| HFC-236cb/butane | | | | | |
| 67.1/32.9 | 52.4 | 361 | 52.4 | 361 | 0.0 |
| 85/15 | 50.7 | 350 | 47.2 | 325 | 6.9 |
| 90/10 | 48.7 | 336 | 41.9 | 289 | 14.0 |
| 88/12 | 49.7 | 343 | 44.2 | 305 | 11.1 |
| 87/13 | 50.1 | 345 | 45.3 | 312 | 9.6 |
| 50/50 | 51.9 | 358 | 50.5 | 348 | 2.7 |
| 40/60 | 51.2 | 353 | 45.7 | 315 | 10.7 |
| 41/59 | 51.2 | 353 | 46.4 | 320 | 9.4 |
| HFC-236cb/cyclopropane | | | | | |
| 29.0/71.0 | 110.4 | 761 | 110.4 | 761 | 0.0 |
| 15/85 | 109.7 | 756 | 108.7 | 749 | 0.9 |
| 1/99 | 105.6 | 728 | 105.2 | 725 | 0.4 |
| 60/40 | 107.5 | 741 | 102.3 | 705 | 4.8 |
| 70/30 | 104.0 | 717 | 91.5 | 631 | 12.0 |
| 65/35 | 106.0 | 731 | 97.9 | 675 | 7.6 |
| 67/33 | 105.3 | 726 | 95.6 | 659 | 9.2 |
| 68/32 | 104.9 | 723 | 94.3 | 650 | 10.1 |
| HFC-236cb/DME | | | | | |
| 24.5/75.5 | 87.2 | 601 | 87.2 | 601 | 0.0 |
| 10/90 | 86.7 | 598 | 86.6 | 597 | 0.1 |
| 1/99 | 85.8 | 592 | 85.8 | 592 | 0.0 |
| 60/40 | 84.0 | 579 | 81.0 | 558 | 3.6 |
| 72/28 | 80.4 | 554 | 72.5 | 500 | 9.8 |
| 73/27 | 80.0 | 552 | 71.5 | 493 | 10.6 |
| HFC-236cb/isobutane | | | | | |
| 56.2/43.8 | 65.3 | 450 | 65.3 | 450 | 0.0 |
| 80/20 | 63.1 | 435 | 57.2 | 394 | 9.4 |
| 81/19 | 62.8 | 433 | 56.0 | 386 | 10.8 |
| 40/60 | 64.8 | 447 | 63.3 | 436 | 2.3 |
| 30/70 | 63.9 | 441 | 58.5 | 403 | 8.5 |
| 28/72 | 63.6 | 439 | 57.3 | 395 | 9.9 |
| HFC-236cb/propane | | | | | |
| 23.6/76.4 | 141.8 | 978 | 141.8 | 978 | 0.0 |
| 10/90 | 140.8 | 971 | 140.1 | 966 | 0.5 |
| 1/99 | 138.2 | 953 | 138.0 | 951 | 0.1 |
| 50/50 | 139.5 | 962 | 136.6 | 942 | 2.1 |
| 70/30 | 133.3 | 919 | 115.2 | 794 | 13.6 |
| 65/35 | 135.6 | 935 | 124.2 | 856 | 8.4 |
| 67/33 | 134.8 | 929 | 121.1 | 835 | 10.2 |
| 66/34 | 135.2 | 932 | 122.7 | 846 | 9.2 |
| HFC-236ea/butane | | | | | |
| 63.3/36.7 | 54.0 | 372 | 54.0 | 372 | 0.0 |
| 80/20 | 53.2 | 367 | 50.5 | 348 | 4.2 |
| 83/17 | 52.7 | 363 | 47.8 | 330 | 9.3 |
| 84/16 | 52.4 | 361 | 46.6 | 321 | 11.1 |
| 40/60 | 53.6 | 370 | 49.7 | 343 | 7.3 |
| 38/62 | 53.5 | 369 | 46.7 | 322 | 12.7 |
| 39/61 | 53.6 | 370 | 48.4 | 334 | 9.7 |
| HFC-236ea/cyclopropane | | | | | |
| 30.9/69.1 | 113.7 | 784 | 113.7 | 784 | 0.0 |
| 15/85 | 113.0 | 779 | 109.9 | 758 | 2.7 |
| 1/99 | 106.6 | 735 | 105.1 | 725 | 1.4 |
| 60/40 | 111.6 | 769 | 106.3 | 733 | 4.7 |
| 68/32 | 109.7 | 756 | 99.2 | 684 | 9.6 |
| HFC-236ea/DME | | | | | |
| 99.3/0.7 | 29.8 | 205 | 29.8 | 205 | 0.0 |

-continued

| Refrigerant Composition | 0 wt % evaporated psia | kPa | 50 wt % evaporated psia | kPa | 0% change in vapor pressure |
|---|---|---|---|---|---|
| 90/10 | 32.1 | 221 | 31.1 | 214 | 3.1 |
| 83/17 | 36.1 | 249 | 32.8 | 226 | 9.1 |
| 82/18 | 36.8 | 254 | 33.1 | 228 | 10.1 |
| HFC-236ea/ isobutane | | | | | |
| 53.6/46.4 | 68.0 | 469 | 68.0 | 469 | 0.0 |
| 30/70 | 67.4 | 465 | 59.6 | 411 | 11.6 |
| 31/69 | 67.5 | 465 | 61.2 | 422 | 9.3 |
| 78/22 | 66.4 | 458 | 59.8 | 412 | 9.9 |
| 79/21 | 66.2 | 456 | 58.3 | 402 | 11.9 |
| HFC-236ea/propane | | | | | |
| 27.5/72.5 | 145.8 | 1005 | 145.8 | 1005 | 0.0 |
| 10/90 | 144.1 | 994 | 141.1 | 973 | 2.1 |
| 1/99 | 138.9 | 958 | 138.0 | 951 | 0.6 |
| 60/40 | 143.2 | 987 | 136.7 | 943 | 4.5 |
| 67/33 | 140.3 | 974 | 127.6 | 880 | 9.7 |
| 68/32 | 140.9 | 971 | 125.7 | 867 | 10.8 |
| HFC-236fa/butane | | | | | |
| 74.4/25.6 | 57.9 | 399 | 57.9 | 399 | 0.0 |
| 90/10 | 56.0 | 386 | 50.5 | 348 | 9.8 |
| 91/9 | 55.6 | 383 | 48.9 | 337 | 12.1 |
| 60/40 | 57.4 | 396 | 56.0 | 386 | 2.4 |
| 50/50 | 56.5 | 390 | 51.1 | 352 | 9.6 |
| 49/51 | 56.4 | 389 | 50.4 | 347 | 10.6 |
| HFC-236fa/ cyclopropane | | | | | |
| 22.4/77.6 | 106.8 | 736 | 106.8 | 736 | 0.0 |
| 10/90 | 106.3 | 733 | 106.2 | 732 | 0.1 |
| 1/99 | 105.2 | 725 | 105.2 | 725 | 0.0 |
| 50/50 | 104.7 | 722 | 102.6 | 707 | 2.0 |
| 70/30 | 98.5 | 679 | 88.7 | 612 | 9.9 |
| HFC-236fa/DME | | | | | |
| 98.4/1.6 | 39.3 | 271 | 39.3 | 271 | 0.0 |
| 99/1 | 39.3 | 271 | 39.3 | 271 | 0.0 |
| 80/20 | 46.7 | 322 | 43.3 | 299 | 7.3 |
| 75/25 | 50.1 | 345 | 45.1 | 311 | 10.0 |
| 70/30 | 53.6 | 370 | 47.1 | 325 | 12.1 |
| HFC-236fa/ isobutane | | | | | |
| 63.6/36.4 | 67.8 | 467 | 67.8 | 467 | 0.0 |
| 80/20 | 66.6 | 459 | 63.8 | 440 | 4.2 |
| 84/16 | 65.6 | 452 | 59.9 | 413 | 8.7 |
| 85/15 | 65.3 | 450 | 58.5 | 403 | 10.4 |
| 40/60 | 66.3 | 457 | 62.5 | 431 | 5.7 |
| 33/67 | 65.1 | 449 | 58.8 | 405 | 9.7 |
| 32/68 | 64.9 | 447 | 58.2 | 401 | 10.3 |
| HFC-236fa/propane | | | | | |
| 7.1/92.9 | 138.0 | 951 | 138.0 | 951 | 0.0 |
| 1/99 | 137.9 | 951 | 137.9 | 951 | 0.0 |
| 40/60 | 134.8 | 929 | 132.8 | 916 | 1.5 |
| 60/40 | 129.1 | 890 | 121.0 | 834 | 6.3 |
| 70/30 | 123.8 | 854 | 107.7 | 743 | 13.0 |
| 65/35 | 126.8 | 874 | 115.4 | 796 | 9.0 |
| 67/33 | 125.7 | 867 | 112.6 | 776 | 10.4 |
| 66/34 | 126.2 | 870 | 114.1 | 787 | 9.6 |

The results of this Example show that these compositions are azeotropic or azeotrope-like because when 50 wt % of an original composition is removed, the vapor pressure of the remaining composition is within about 10% of the vapor pressure of the original composition, at a temperature of 25° C.

EXAMPLE 3
Impact of Vapor Leakage at 50° C. and 75° C.

A leak test is performed on compositions of HFC-236ca and isobutane as in Example 2, but at temperatures of 50° C. and 75° C. The results are summarized below.

| Refrigerant Composition | 0 wt % evaporated psia | kPa | 50 wt % evaporated psia | kPa | 0% change in vapor pressure |
|---|---|---|---|---|---|
| HFC-236ca/isobutane* | | | | | |
| 53.3/46.7 | 128.7 | 887 | 128.7 | 887 | 0.0 |
| 78/22 | 126.2 | 870 | 113.7 | 784 | 9.9 |
| 79/21 | 125.8 | 867 | 110.8 | 764 | 11.9 |
| 30/70 | 127.3 | 878 | 115.4 | 796 | 9.3 |
| 29/71 | 127.2 | 877 | 113.3 | 781 | 10.9 |
| *temperature at 50° C. HFC-236ca/isobutane* | | | | | |
| 55.9/44.1 | 228.0 | 1572 | 228.0 | 1572 | 0.0 |
| 79/21 | 223.1 | 1538 | 2023 | 1395 | 9.3 |
| 80/20 | 222.4 | 1533 | 197.6 | 1362 | 11.1 |
| 32/68 | 225.1 | 1552 | 204.8 | 1412 | 9.0 |
| 31/69 | 224.8 | 1550 | 201.5 | 1389 | 10.4 |

*temperature at 75° C.

These results show that compositions of HFC-236ca and isobutane are azeotropic or azeotrope-like at different temperatures, but that the weight percents of the components vary as the temperature is changed.

EXAMPLE 4

Refrigerant Performance

The following table shows the performance of various refrigerants in an ideal vapor compression cycle. The data are based on the following conditions.

Evaporator temperature 48.0F. (8.9° C.)
Condenser temperature 115.0° F. (46.1° C.)
Liquid subcooled to 12° F. (6.7° C.)
Return Gas 65° F. (18.3° C.)
Compressor efficiency is 75%.

The refrigeration capacity is based on a compressor with a fixed displacement of 3.5 cubic feet per minute and 75% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Refrig. Comp. | Evap. Press. Psia | kPa | Cond. Press. Psia | kPa | Comp. Dis. Temp. ° F. | ° C. | COP | Capacity BTU/min kw | |
|---|---|---|---|---|---|---|---|---|---|
| HFC-236ca/butane | | | | | | | | | |
| 1.0/99.0 | 21 | 145 | 65 | 448 | 137 | 58 | 4.89 | 102 | 1.8 |
| 99.0/1.0 | 14 | 97 | 49 | 338 | 134 | 57 | 4.85 | 75 | 1.3 |
| HFC-236ca/cyclopropane | | | | | | | | | |
| 1.0/99.0 | 66 | 455 | 177 | 1220 | 174 | 79 | 4.87 | 288 | 5.1 |
| 99.0/1.0 | 15 | 103 | 53 | 365 | 134 | 57 | 4.99 | 83 | 1.5 |
| HFC-236ca/isobutane | | | | | | | | | |
| 1.0/99.0 | 31 | 214 | 90 | 621 | 135 | 57 | 4.78 | 138 | 2.4 |
| 99.0/1.0 | 14 | 97 | 49 | 338 | 134 | 57 | 4.85 | 76 | 1.3 |
| HFC-236ca/propane | | | | | | | | | |
| 1.0/99.0 | 87 | 600 | 226 | 1558 | 145 | 63 | 4.53 | 325 | 5.7 |

-continued

| Refrig. Comp. | Evap. Press. | | Cond. Press. | | Comp. Dis. Temp. | | COP | Capacity BTU/min | kw |
|---|---|---|---|---|---|---|---|---|---|
| | Psia | kPa | Psia | kPa | °F. | °C. | | | |
| 99.0/1.0 HFC-236cb/butane | 15 | 103 | 52 | 359 | 134 | 57 | 4.97 | 82 | 1.4 |
| 1.0/99.0 | 21 | 145 | 65 | 448 | 137 | 58 | 4.89 | 102 | 1.8 |
| 99.0/1.0 HFC-236cb/cyclopropane | 20 | 138 | 64 | 441 | 129 | 54 | 4.74 | 96 | 1.7 |
| 1.0/99.0 | 66 | 455 | 177 | 1220 | 174 | 79 | 4.87 | 288 | 5.1 |
| 99.0/1.0 HFC-236cb/DME | 21 | 145 | 68 | 469 | 130 | 54 | 4.86 | 105 | 1.8 |
| 1.0/99.0 | 51 | 352 | 149 | 1027 | 167 | 75 | 4.88 | 240 | 4.2 |
| 99.0/1.0 HFC-236cb/isobutane | 21 | 145 | 68 | 469 | 130 | 54 | 4.85 | 104 | 1.8 |
| 1.0/99.0 | 31 | 214 | 90 | 621 | 135 | 57 | 4.79 | 138 | 2.4 |
| 99.0/1.0 HFC-236cb/propane | 20 | 138 | 64 | 441 | 129 | 54 | 4.75 | 96 | 1.7 |
| 1.0/99.0 | 88 | 607 | 226 | 1558 | 145 | 63 | 4.54 | 325 | 5.7 |
| 99.0/1.0 HFC-236ea/butane | 21 | 145 | 67 | 462 | 130 | 54 | 4.82 | 103 | 1.8 |
| 1.0/99.0 | 21 | 145 | 65 | 448 | 137 | 58 | 4.89 | 102 | 1.8 |
| 99.0/1.0 HFC-236ea/DME | 16 | 110 | 56 | 386 | 133 | 56 | 4.81 | 85 | 1.5 |
| 1.0/99.0 HFC-236ea/cyclopropane | 50 | 343 | 146 | 1009 | 169 | 76 | 4.86 | 235 | 4.1 |
| 1.0/99.0 | 66 | 455 | 177 | 1220 | 174 | 79 | 4.87 | 288 | 5.1 |
| 99.0/1.0 HFC-236ea/isobutane | 18 | 124 | 60 | 414 | 134 | 57 | 4.93 | 93 | 1.6 |
| 1.0/99.0 | 31 | 214 | 90 | 621 | 135 | 57 | 4.78 | 138 | 2.4 |
| 99.0/1.0 HFC-236ea/propane | 16 | 110 | 56 | 386 | 134 | 57 | 4.81 | 85 | 1.5 |
| 1.0/99.0 | 87 | 600 | 226 | 1558 | 145 | 63 | 4.53 | 325 | 5.7 |
| 99.0/1.0 HFC-236fa/butane | 18 | 124 | 59 | 407 | 134 | 57 | 4.91 | 92 | 1.6 |
| 1/99 | 21 | 145 | 66 | 455 | 137 | 58.3 | 4.91 | 104 | 1.8 |
| 99/1 HFC-236fa/cyclopropane | 23 | 159 | 73 | 503 | 129 | 53.9 | 4.77 | 109 | 1.9 |
| 1.0/99.0 | 66 | 455 | 178 | 1227 | 174 | 79 | 4.87 | 289 | 5.1 |
| 99.0/1.0 HFC-236fa/isobutane | 23 | 159 | 74 | 510 | 130 | 54 | 4.81 | 112 | 2.0 |
| 1/99 | 31 | 214 | 90 | 621 | 135 | 57.2 | 4.80 | 139 | 2.4 |
| 99/1 HFC-236fa/propane | 22 | 152 | 73 | 503 | 129 | 53.9 | 4.71 | 108 | 1.9 |
| 1.0/99.0 | 88 | 607 | 226 | 1558 | 145 | 63 | 4.54 | 325 | 5.7 |
| 99.0/1.0 HFC-236fa/DME | 23 | 159 | 73 | 503 | 129 | 54 | 4.77 | 110 | 1.9 |
| 75.0/25.0 | 27 | 185 | 86 | 592 | 146 | 63 | 4.93 | 136 | 2.4 |
| 99.0/1.0 | 22 | 149 | 70 | 481 | 130 | 54 | 4.72 | 104 | 1.8 |

EXAMPLE 5

This Example is directed to the vapor pressure of the following liquid mixtures of this invention, all at 25° C.: BFC-236ca/butane; HFC-236ca/cyclopropane; HFC-236ca/isobutane; HFC-236ca/propane; HFC-236cb/butane; HFC-236cb/cyclopropane; HFC-236cb/D ME; HFC-236cb/isobutane; HFC-236cb/propane; HFC-236ea/butane; HFC-236ea/cyclopropane; HFC-236ea/isobutane; HFC-236ea/propane; HFC-236fa/cyclopropane; and HFC-236fa/propane. The vapor pressures for these mixtures are shown in FIGS. 1–11, 13–14, 16 and 18.

The vapor pressure data for the graphs in FIG. 1 are obtained as follows. A stainless steel cylinder is evacuated, and a weighed amount of HFC-236ca is added to the cylinder. The cylinder is cooled to reduce the vapor pressure of HFC-236ca, and then a weighed amount of butane is added to the cylinder. The cylinder is agitated to mix the HFC-236ca and butane, and then the cylinder is placed in a constant temperature bath until the temperature comes to equilibrium, at which time the vapor pressure of the HFC-236ca and butane in the cylinder is measured. This procedure is repeated at the same temperature with different weight percents of the components, and the results are plotted in FIG. 1.

Data are obtained in the same way for mixtures of HFC-236ca/cyclopropane; HFC-236ca/isobutane; HFC-236ca/propane; HFC-236cb/butane; HFC-236cb/cyclopropane; HFC-236cb/DME; HFC-236cb/isobutane; HFC-236cb/propane; HFC-236ea/butane; HFC-236ea/cyclopropane; HFC-236ea/isobutane; HFC-236ea/propane; HFC-236fa/cyclopropane; and HFC-236fa/propane at 25° C., and the results are plotted in FIGS. 2–11, 13–14, 16 and 18.

The data in FIGS. 1–11, 13–14, 16 and 18 show that at 25° C., there are ranges of compositions that have vapor pressures higher than the vapor pressures of the pure components of the composition at that same temperature.

EXAMPLE 6

This Example is directed to the vapor pressure of following liquid mixtures of this invention: HFC-236ea/DME; HFC-236fa/butane; HFC-236fa/isobutane; and HFC-236fa/DME. The vapor pressures of these mixtures were measured at particular compositions as shown by the asterisks in FIGS. 12, 15, 17 and 19, and a best fit curve was drawn through the asterisks.

The procedure for measuring the vapor pressures for mixtures of HFC-236ea and DME was as follows. A stainless steel cylinder was evacuated, and a weighed amount of HFC-236ea was added to the cylinder. The cylinder was cooled to reduce the vapor pressure of HFC-236ea, and then a weighed amount of DME was added to the cylinder. The cylinder was agitated to mix the HFC-236ea and DME, and then the cylinder was placed in a constant temperature bath until the temperature came to equilibrium at 0° C., at which time the vapor pressure of the content of the cylinder was measured. This procedure was repeated for various mixtures of HFC-236ea and DME as indicated in FIG. 12.

Figure 12:
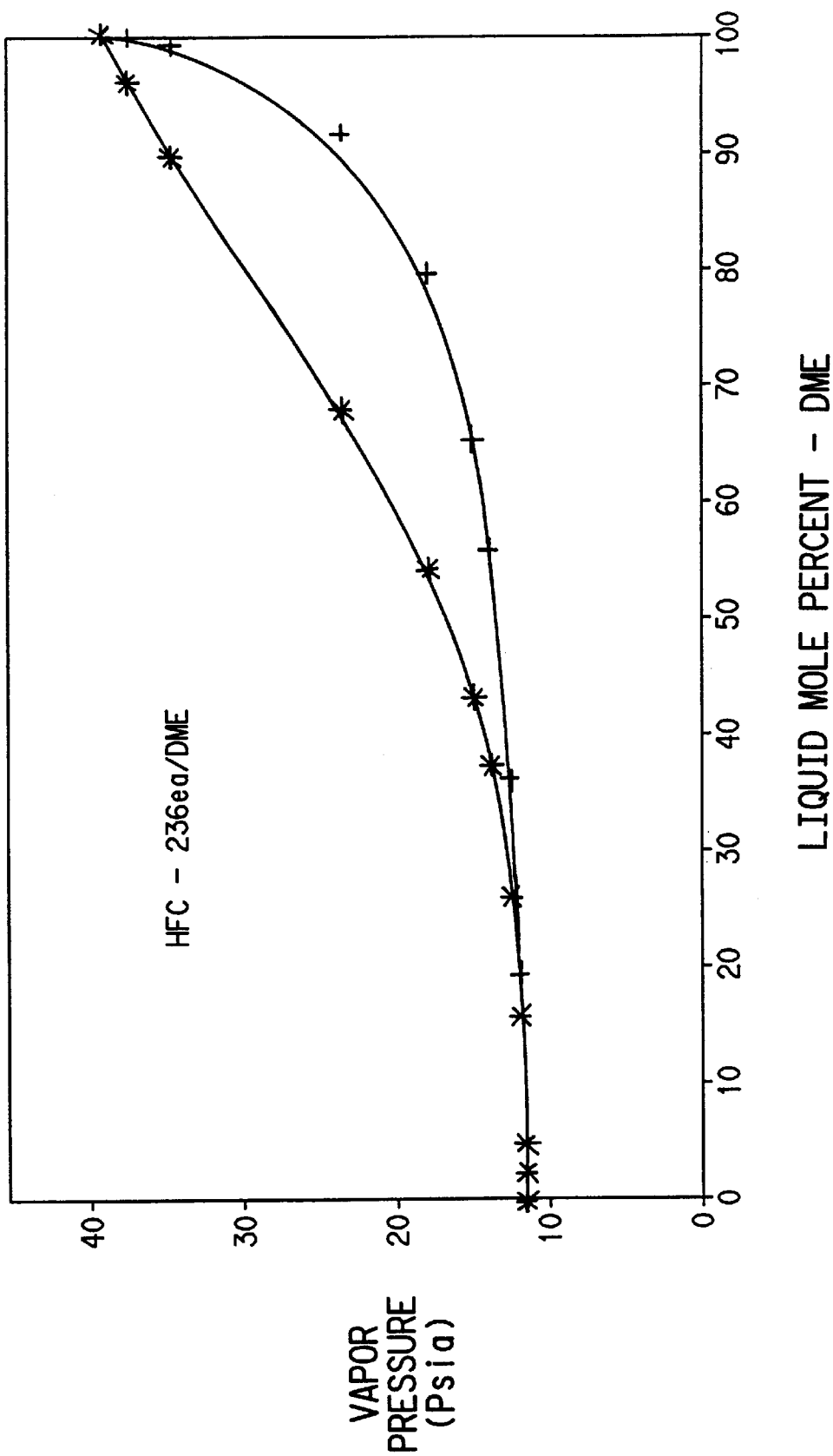
FIG. 12 is a graph of the vapor pressure of liquid mixtures of HFC-236ea and DME at 0° C.
Figure 13:
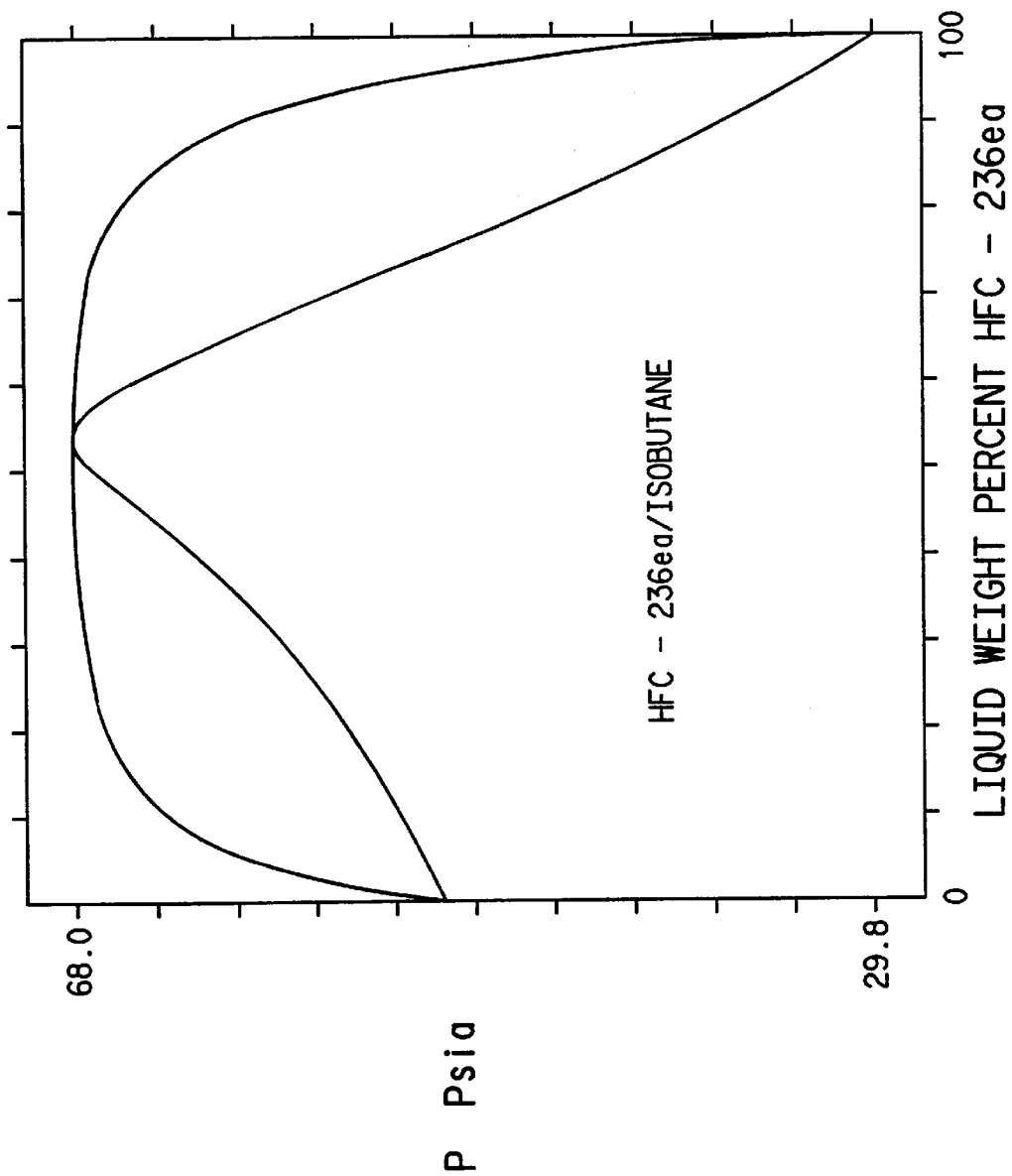
FIG. 13 is a graph of the vapor pressure of liquid mixtures of HFC-236ea and isobutane at 25° C.
Figure 14:
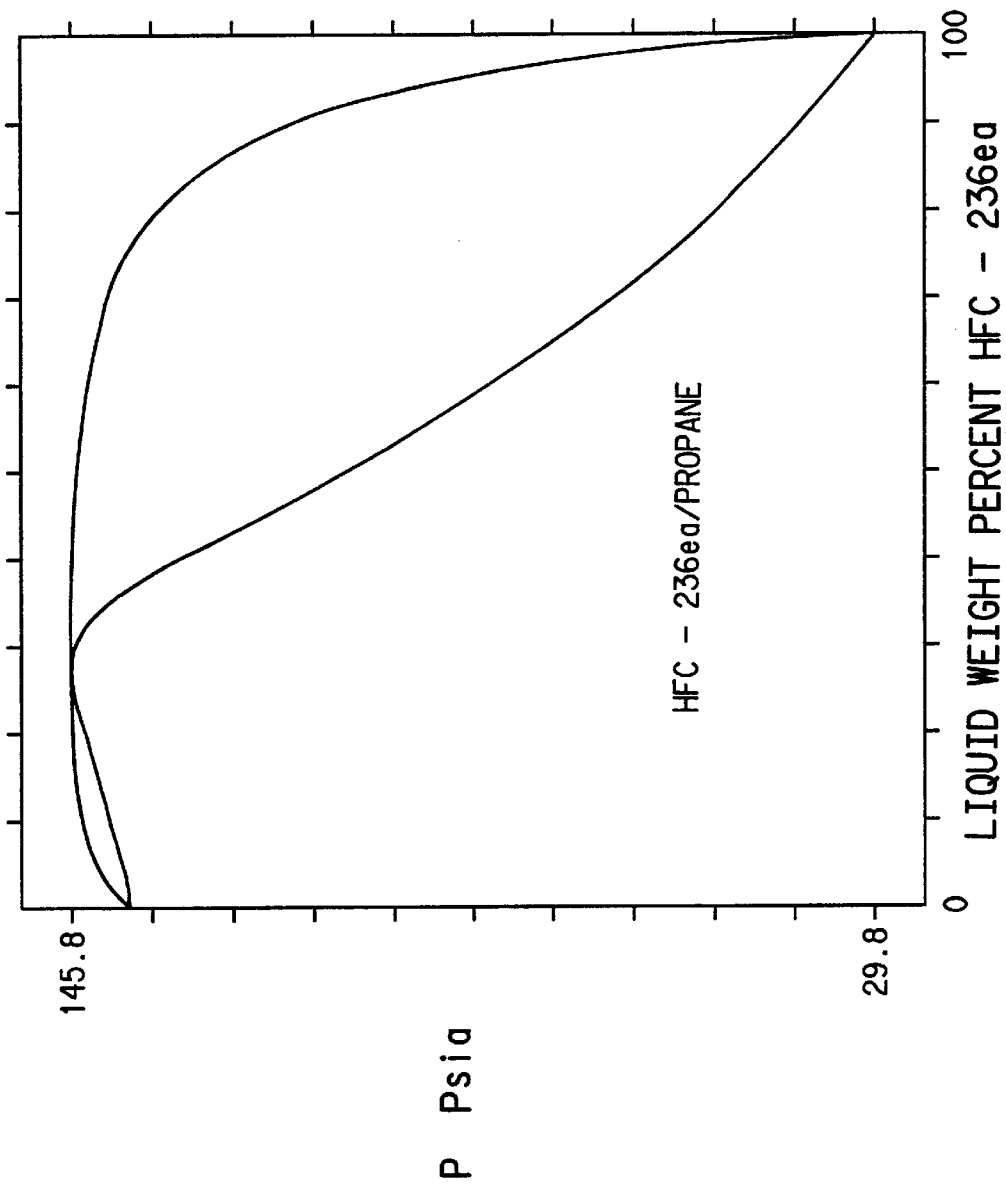
FIG. 14 is a graph of the vapor pressure of liquid mixtures of HFC-236ea and propane at 25° C.
Figure 19:
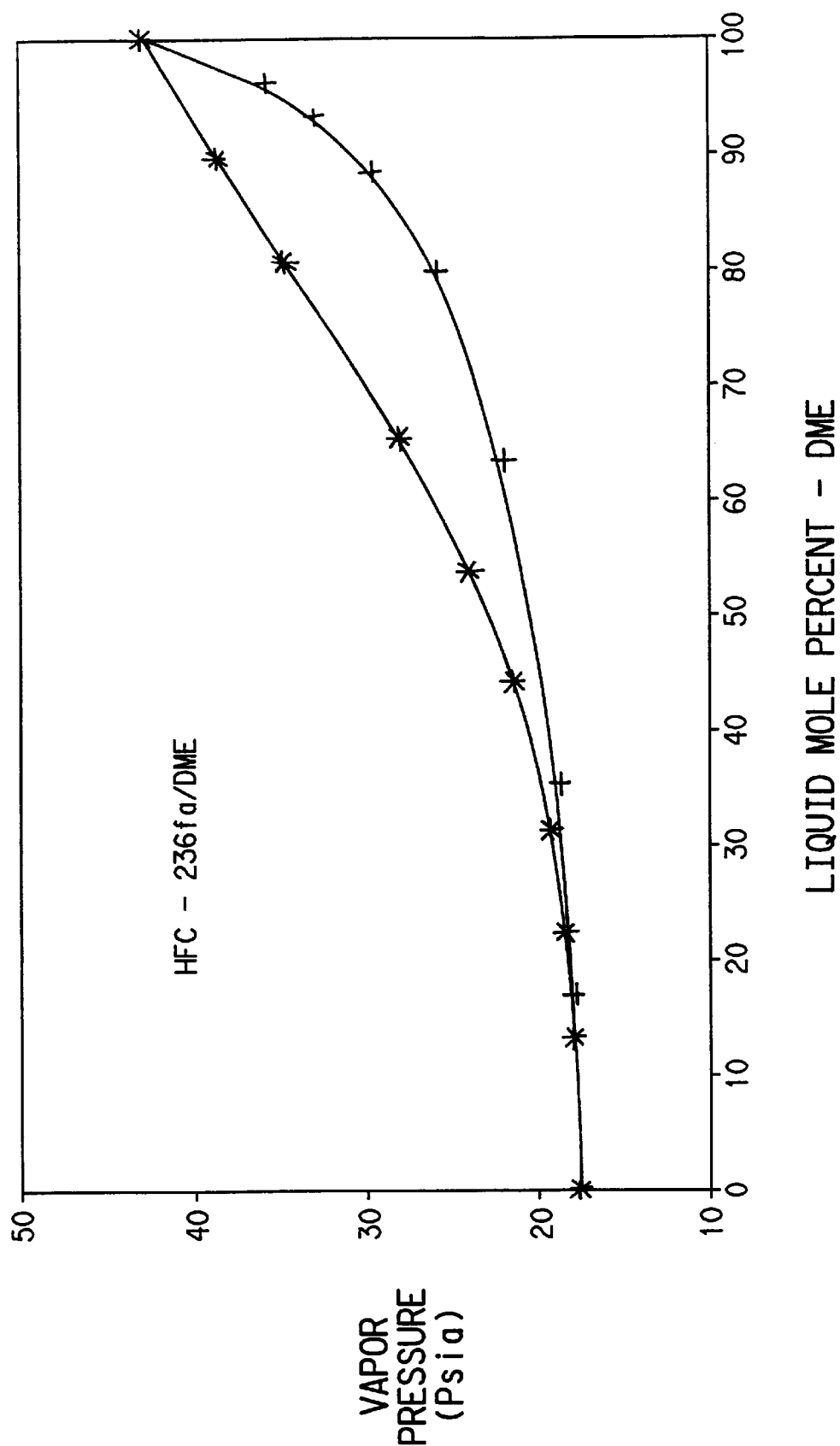
FIG. 19 is a graph of the vapor pressure of liquid mixtures of HFC-236fa and DME at 3° C.

The data in FIGS. 12 and 19 show that at 0° C., there are ranges of compositions that have vapor pressures lower than the vapor pressures of the pure components of the composition at that same temperature.

Figure 15:
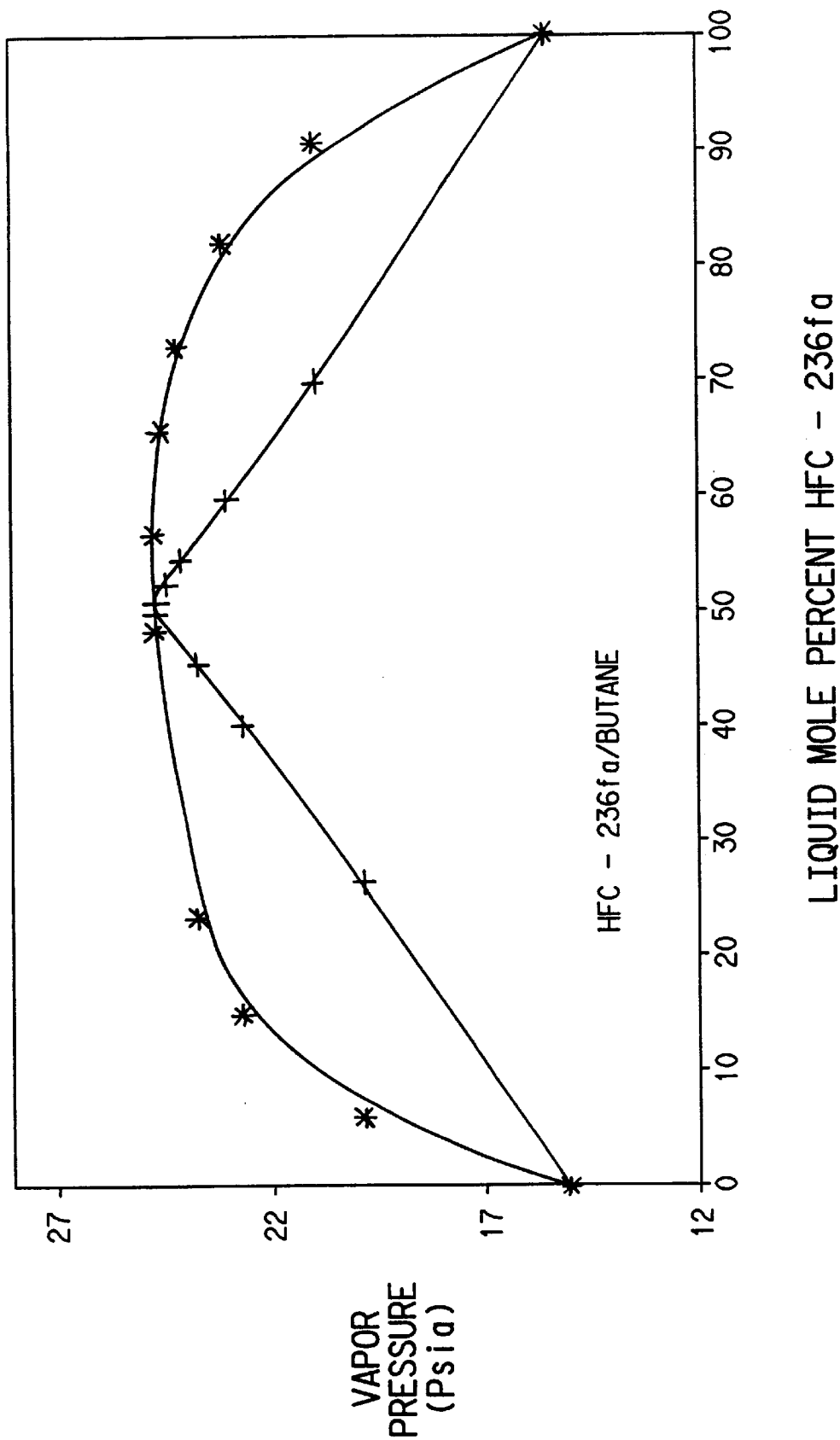
FIG. 15 is a graph of the vapor pressure of liquid mixtures of BFC-236fa and butane at 0° C.
Figure 16:
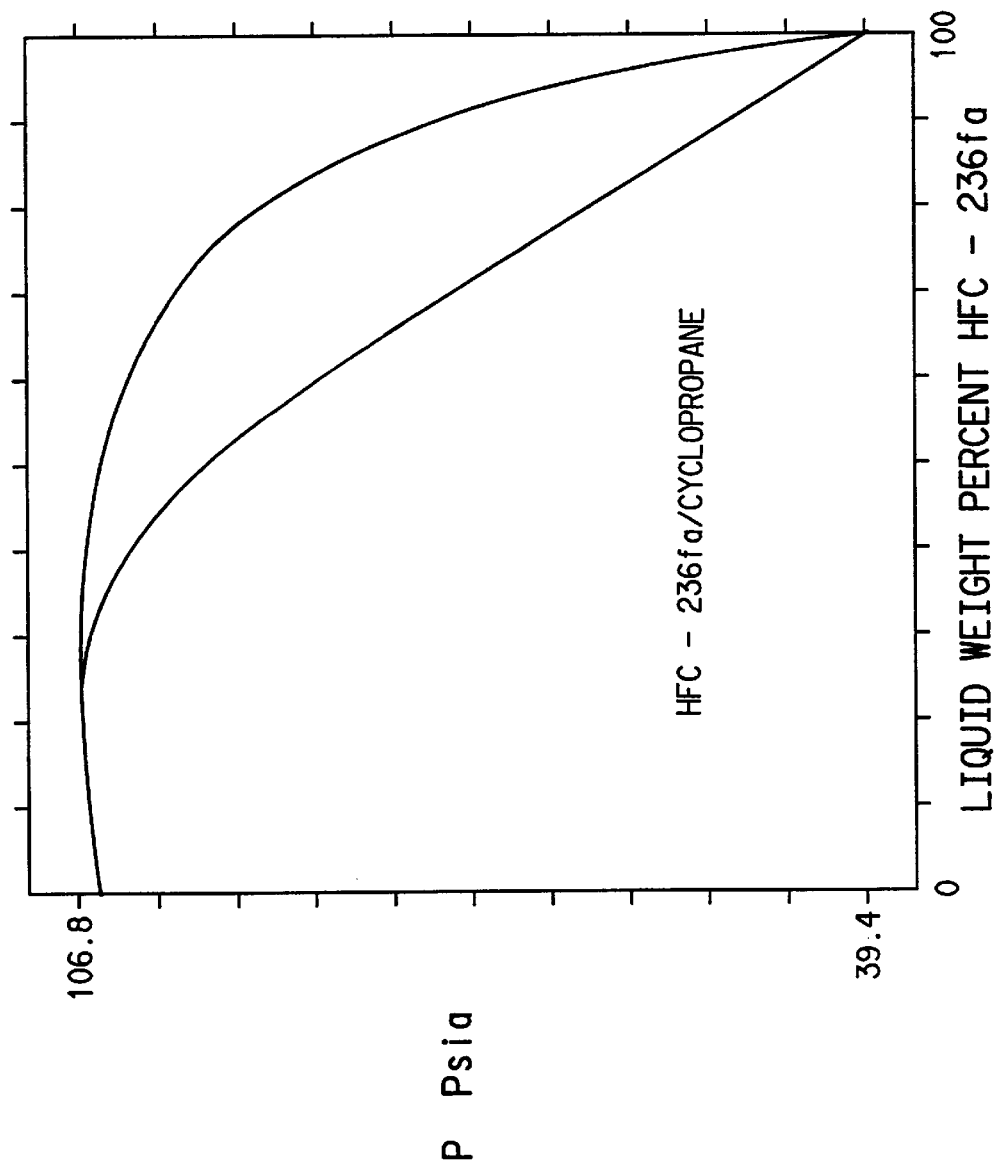
FIG. 16 is a graph of the vapor pressure of liquid mixtures of HFC-236fa and cyclopropane at 25° C.
Figure 17:
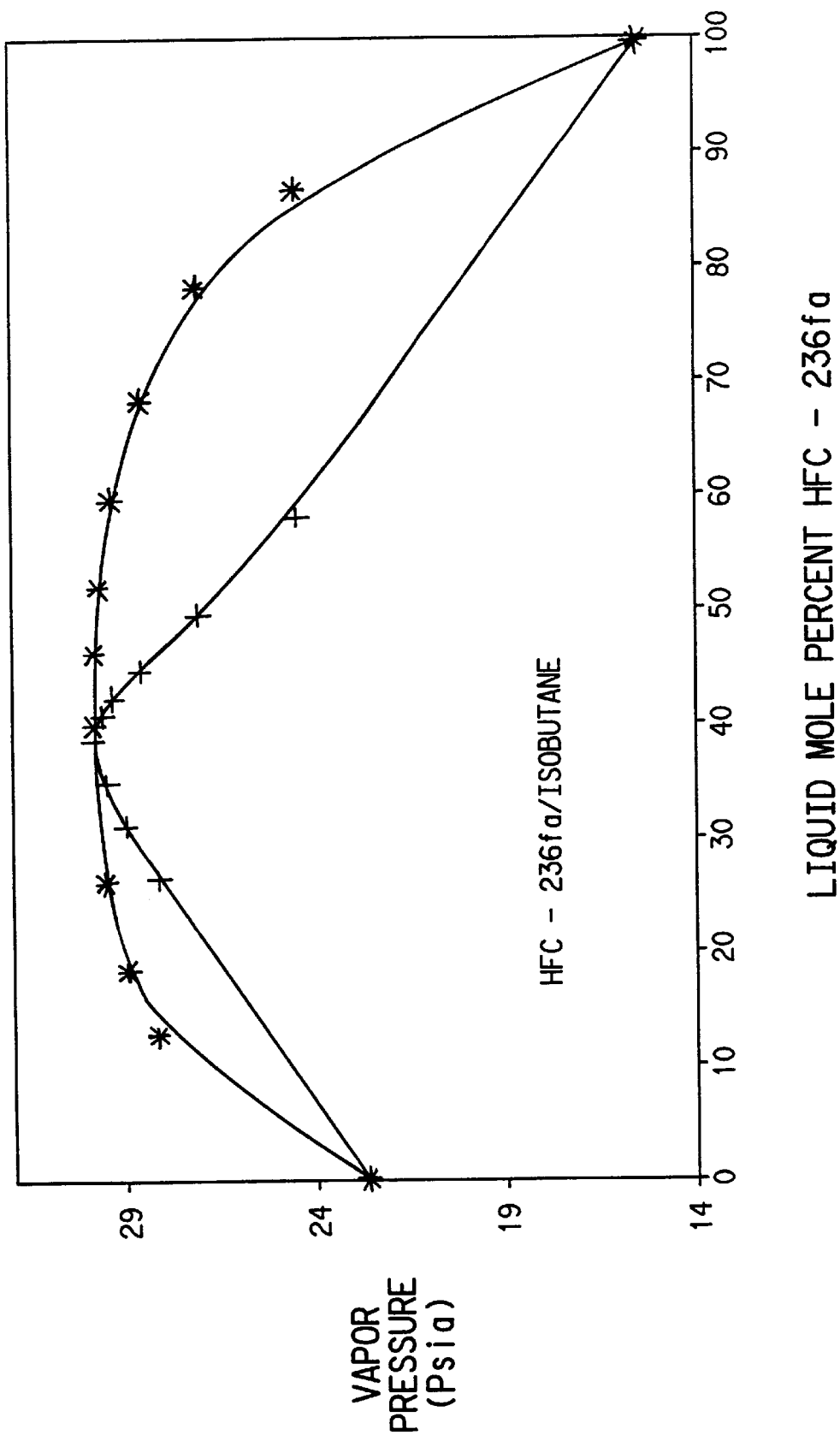
FIG. 17 is a graph of the vapor pressure of liquid mixtures of HFC-236fa and isobutane at 0° C.
Figure 18:
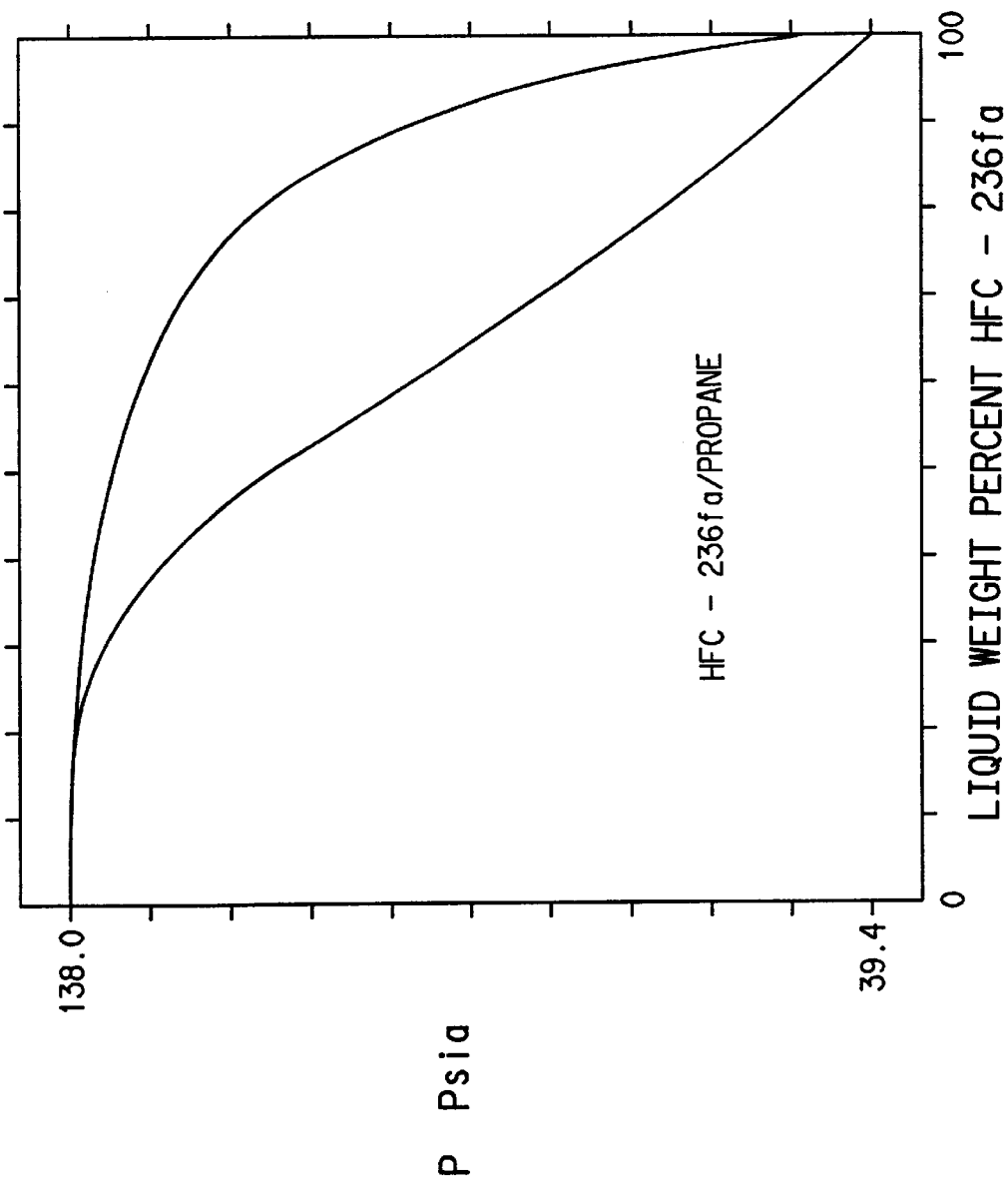
FIG. 18 is a graph of the vapor pressure of liquid mixtures of HFC-236fa and propane at 25° C.

The data in FIGS. 15 and 17 show that at 0° C., there are ranges of compositions that have vapor pressures higher than the vapor pressures of the pure components of the composition at that same temperature.

The procedure for measuring the vapor pressure of mixtures of HFC-236ea/DME were carried out in the same way for mixtures of HFC-236fa/butane, HFC-236fa/isobutane, and HFC-236fa/DME, except that the measurements of the vapor pressure of mixtures of HFC-236fa/DME were taken at 3° C.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

The compositions of the present inventions are useful as blowing agents in the production of thermoset foams, which include polyurethane and phenolic foams, and thermoplastic foams, which include polystyrene or polyolefin foams.

A polyurethane foam may be made by combining a composition of the present invention, which functions as a blowing agent, together with an isocyanate, a polyol, and appropriate catalysts or surfactants to form a poylurethane or polyisocyanurate reaction formulation. Water may be added to the formulation raction to modify the foam polymer as well as to generate carbon dioxide as an in-situ blowing agent.

A phenolic foam may be produced by combining a phenolic resin or resole, acid catalysts, a blowing agent of the present invention and appropriate surfactants to form a phenolic reaction formulation. The formulation may be chosen such that either an open cell or closed cell phenolic foam is produced.

Polystyrene or polyolefin foams may be made by extruing, a molten mixture of a polymer, such as polystyrere, polyethylene or polypropylene), a nucleating agent and a blowing agent of the present invention through an extrusion die that yields the desired foam product profile.

The novel compositions of this invention, including the azeotropic or azeotrope-like compositions, may be used as cleaning agents to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. This is conventionally done by suspending a circuit board to be cleaned in a boiling sump which contains the azeotropic or azeotrope-like composition, then suspending the circuit board in a rinse sump, which contains the same azeotropic or azeotrope-like composition, and finally, for one minute in the solvent vapor above the boiling sump.

As a further example, the azeotropic mixtures of this invention can be used in cleaning processes such as described in U.S. Pat. No. 3,881,949, or as a buffing abrasive detergent.

It is desirable that the cleaning agents be azeotropic or azeotrope-like so that they do not tend to fractionate upon boiling or evaporation. This behavior is desirable because if the cleaning agent were not azeotropic or azeotrope-like, the more volatile components of the cleaning agent would preferentially evaporate, and would result in a cleaning agent with a changed composition that may become flammable and that may have less-desirable solvency properties, such as lower rosin flux solvency and lower inertness toward the electrical components being cleaned. The azeotropic character is also desirable in vapor degreasing operations because the cleaning agent is generally redistilled and employed for final rinse cleaning.

The novel compositions of this invention are also useful as fire extinguishing agents, heat transfer media, gaseous dielectrics, and power cycle working fluids.

ADDITIONAL COMPOUNDS

Other components, such as aliphatic hydrocarbons having a boiling point of −60 to +60° C., hydrofluorocarbonalkanes having a boiling point of −60 to +60° C., hydrofluoropropanes having a boiling point of between −60 to +60° C., hydrocarbon esters having a boiling point between −60 to +60° C., hydrochlorofluorocarbons having a boiling point between −60 to +60° C., hydrofluorocarbons having a boiling point of −60 to +60° C., hydrochlorocarbons having a boiling point between −60 to +60° C., chlorocarbons and perfluorinated compounds, can be added to the azeotropic or azeotrope-like compositions described above.

Additives such as lubricants, corrosion inhibitors, surfactants, stabilizers, dyes and other appropriate materials may be added to the novel compositions of the invention for a variety of purposes provides they do not have an adverse influence on the composition for its intended application. Preferred lubricants include esters having a molecular weight greater than 250.

We claim:

1. An azeotropic or azeotrope-like composition consisting essentially of, by weight, about 81% to about 37% of 1,1,2,2,3,3-hexafluoropropane (HFC 236ca) and about 19% to about 63% of n-butane (R 600), wherein the vapor pressure of said composition at about 25° C. is about 51.0 psia to about 51.8 psia, and wherein the vapor pressure of said composition changes by less than about 10 percent after 50% of said composition has been evaporated at about 25° C.

2. An azeotropic or azeotrope-like composition consisting essentially of, by weight, about 87% to about 41% of 1,1,1,2,2,3-hexafluoropropane (HFC 236cb) and about 13% to about 59% of n-butane (R 600), wherein the vapor pressure of said composition at about 25° C. is about 50.1 psia to about 52.4 psia, and wherein the vapor pressure of said composition changes by less than about 10 percent after 50% of said composition has been evaporated at about 25° C.

3. An azeotropic or azeotrope-like composition consisting essentially of, by weight, about 83% to about 39% of 1,1,2,3,3,3-hexafluoropropane (HFC 236ea) and about 17% to about 61% of n-butane (R 600), wherein the vapor pressure of said composition at about 25° C. is about 52.7 psia to about 54.0 psia, and wherein the vapor pressure of said composition changes by less than about 10 percent after 50% of said composition has been evaporated at about 25° C.

4. An azeotropic or azeotrope-like composition consisting essentially of, by weight, about 90% to about 50% of 1,1,1,3,3,3-hexafluoropropane (HFC 236fa) and about 10% to about 50% of n-butane (R 600), wherein the vapor pressure of said composition at about 25° C. is about 56.0 psia to about 57.9 psia, and wherein the vapor pressure of said composition changes by less than about 10 percent after 50% of said composition has been evaporated at about 25° C.

5. A process for producing refrigeration, comprising condensing a composition of claim 1 and thereafter evaporating said composition in the vicinity of the body to be cooled.

6. A process for producing refrigeration, comprising condensing a composition of claim 2 and thereafter evaporating said composition in the vicinity of the body to be cooled.

7. A process for producing refrigeration, comprising condensing a composition of claim 3 and thereafter evaporating said composition in the vicinity of the body to be cooled.

8. A process for producing refrigeration, comprising condensing a composition of claim 4 and thereafter evaporating said composition in the vicinity of the body to be cooled.

9. A process for producing heat comprising condensing a composition of claim 1 in the vicinity of a body to be heated, and thereafter evaporating said composition.

10. A process for producing heat comprising condensing a composition claim 2 in the vicinity of a body to be heated, and thereafter evaporating said composition.

11. A process for producing heat comprising condensing a composition claim 3 in the vicinity of a body to be heated, and thereafter evaporating said composition.

12. A process for producing heat comprising condensing a composition of claim 4 in the vicinity of a body to be heated, and thereafter evaporating said composition.

13. A process of preparing a thermoset or thermoplastic foam comprising the step of foaming a mixture of the composition of claim 1 and a thermoset or thermoplastic material.

14. A process of preparing a thermoset or thermoplastic foam comprising the step of foaming a mixture of the composition of claim 2 and a thermoset or thermoplastic material.

15. A process of preparing a thermoset or thermoplastic foam comprising the step of foaming a mixture of the composition of claim 3 and a thermoset or thermoplastic material.

16. A process of preparing a thermoset or thermoplastic foam comprising the step of foaming a mixture of the composition of claim 4 and a thermoset or thermoplastic material.

17. A process for cleaning a solid surface comprising treating said surface with the composition of claim 1.

18. A process for cleaning a solid surface comprising treating said surface with the composition of claim 2.

19. A process for cleaning a solid surface comprising treating said surface with the composition of claim 3.

20. A process for cleaning a solid surface comprising treating said surface with on of claim 4.

* * * * *